US010769459B2

(12) United States Patent
Tamrakar et al.

(10) Patent No.: US 10,769,459 B2
(45) Date of Patent: Sep. 8, 2020

(54) METHOD AND SYSTEM FOR MONITORING DRIVING BEHAVIORS

(71) Applicant: SRI International, Menlo Park, CA (US)

(72) Inventors: Amir Tamrakar, Philadelphia, PA (US); Gregory Ho, Lawrenceville, NJ (US); David Salter, Bensalem, PA (US); Jihua Huang, Philadelphia, PA (US)

(73) Assignee: SRI International, Menlo Park, CA (US)

( * ) Notice: Subject to any disclaimer, the term of this patent is extended or adjusted under 35 U.S.C. 154(b) by 189 days.

(21) Appl. No.: 15/751,339

(22) PCT Filed: Aug. 30, 2016

(86) PCT No.: PCT/US2016/049480
§ 371 (c)(1),
(2) Date: Feb. 8, 2018

(87) PCT Pub. No.: WO2017/040519
PCT Pub. Date: Mar. 9, 2017

(65) Prior Publication Data
US 2018/0239975 A1 Aug. 23, 2018

Related U.S. Application Data

(60) Provisional application No. 62/212,272, filed on Aug. 31, 2015.

(51) Int. Cl.
G06K 9/00 (2006.01)
G08B 21/06 (2006.01)

(52) U.S. Cl.
CPC ..... G06K 9/00845 (2013.01); G06K 9/00261 (2013.01); G06K 9/00281 (2013.01); G08B 21/06 (2013.01)

(58) Field of Classification Search
CPC .......... G06K 9/00845; G06K 9/00261; G06K 9/00281; G08B 21/06
(Continued)

(56) References Cited

U.S. PATENT DOCUMENTS

2009/0034801 A1* 2/2009 Hammoud ......... G06K 9/00335
382/107
2011/0135152 A1* 6/2011 Kashiwagi ......... G06K 9/00261
382/103
(Continued)

FOREIGN PATENT DOCUMENTS

CN 103020594 A 4/2013
DE 102006037156 A1 9/2007
(Continued)

OTHER PUBLICATIONS

International Search Report and Written Opinion, International Application No. PCT/US2016/049480, dated Dec. 29, 2016, 9 pages.
(Continued)

Primary Examiner — Andrew M Moyer
(74) Attorney, Agent, or Firm — Shumaker & Sieffert, P.A.

(57) ABSTRACT

A method and a system are provided for monitoring driving conditions. The method includes receiving video data comprising video frames from one or more sensors where the video frames may represent an interior or exterior of a vehicle, detecting and recognizing one or more features from the video data where each feature is associated with at least one driving condition, extracting the one or more features from the video data, developing intermediate features by associating and aggregating the extracted features among the extracted features, and developing a semantic meaning for the at least one driving condition by utilizing the intermediate features and the extracted one or more features.

13 Claims, 33 Drawing Sheets

(58) Field of Classification Search
USPC .......................................................... 382/118
See application file for complete search history.

(56) References Cited

U.S. PATENT DOCUMENTS

| | | | |
|---|---|---|---|
| 2013/0021578 A1* | 1/2013 | Chen ................. | G06K 9/00604 351/209 |
| 2015/0092056 A1* | 4/2015 | Rau ...................... | B60W 40/09 348/148 |
| 2015/0169938 A1 | 6/2015 | Yao et al. | |
| 2015/0213604 A1* | 7/2015 | Li .......................... | G06T 13/40 345/473 |
| 2016/0191958 A1* | 6/2016 | Nauseef ........... | H04N 21/23418 725/116 |

FOREIGN PATENT DOCUMENTS

| | | |
|---|---|---|
| JP | 2006258428 A | 9/2006 |
| WO | 2014194439 A1 | 12/2014 |

OTHER PUBLICATIONS

Extended Search Report from counterpart European Application No. 16842812.6, dated Jul. 18, 2019, 13 pp.

Fan et al., "Automatic Model-Based Semantic Object Extraction Algorithm," IEEE Transactions on circuits and systems for video technology, vol. 11, No. 10, Oct. 2001, 12 pp.

Response to Extended Search Report dated Aug. 6, 2019, from counterpart European Application No. 16842812.6, filed Feb. 6, 2020, 17 pp.

* cited by examiner

METHOD AND SYSTEM FOR MONITORING DRIVING BEHAVIORS

CROSS REFERENCE TO RELATED APPLICATIONS

This application is a U.S. National Stage Entry of International Application No. PCT/US2016/049480, filed on Aug. 30, 2016, and claims the benefit of U.S. Provisional Patent Application Ser. No. 62/212,272, filed on Aug. 31, 2015, and entitled "MULTISOCIAL DRIVER STATE AND BEHAVIOR ANALYSIS," both of which are incorporated herein by reference in their entirety.

STATEMENT REGARDING FEDERALLY SPONSORED RESEARCH

This invention was made with Government support under contract numbers DTFH6114C00005 and DTFH6114C00007 awarded by the Federal Highway Administration.

BACKGROUND

According to the statistics released by national highway traffic safety administration, more than thirty-two thousand people died in motor vehicle crashes in 2014. A lot of those deadly accidents may be caused by certain driving behaviors. However, even though videos exist to record driving activities for a period of time, technical challenges still exist to detect and recognize the video data and be able to track the driving behaviors. In addition, the driver in the recorded videos may not be willing to reveal his or her identity; as such it may also be important to generalize the identify for the driver in the recorded videos for undertaking a driving behavior analysis. As such, additional technical challenges exist for generalizing a driver's identity in the recorded video while preserving the driving activities and behaviors.

BRIEF DESCRIPTION OF DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION

Figure 1:
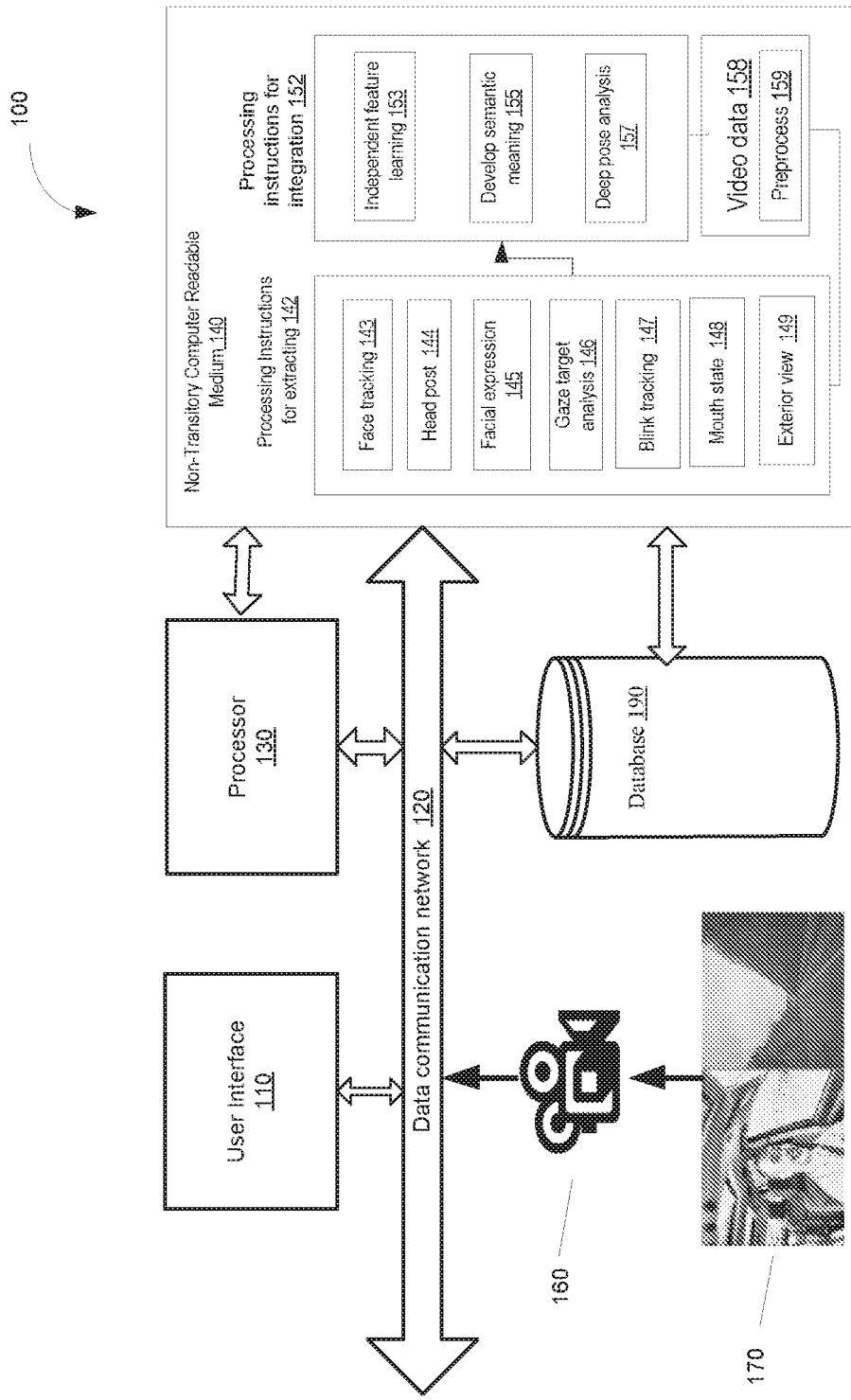
FIG. 1 is a diagram showing an example implementation of system for monitoring a driver's driving behaviors.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

In order to improve the highway safety, it is important to understand driving behaviors. A lot of data may exist and be available to conduct a driving behavior analysis. For example, cameras may be placed inside and outside of a driving vehicle to record the driving activities inside a car and/or cameras may be placed to capture an exterior view around the vehicle while the vehicle is driving. The recorded data may include driving data for different lighting conditions: day-time, night-time, and transitional light. The recorded data may also include driving data for different drivers such as different genders, age groups, ethnicities, facial hair, eye wear, and head gear. However, certain mechanism needs to be developed to analyze the recorded data and develop the understanding of the driving behaviors.

Driving features may be identified and coded from the recorded videos. Driving features may include driver state and driver actions. The driver state may include, for example, head pose, gaze, eye blinks, mouth movement, facial expressions, and hand positioning and/or motion. The driver actions may include gestures and actions. Also, additional features may be identified and coded for factors outside the vehicle such as traffic conditions, weather conditions, road conditions, actions of pedestrians, bicycles, vehicles, traffic lights, and road signs. Driving features inside the vehicle may also be identified and coded, for example, passengers, passenger-caused distractions, radio, cell phones, travel mugs, and gadget-caused distractions.

The identified and coded features may be integrated and aggregaged. For example, a driver's gaze direction may relate to a vehicle accident. For a comprehensive driving behavior study, the study may need to take into account driver's actions and behaviors in the context that those actions are performed. As such, it is preferable to correlate identified and coded features and discover semantic meanings among those features with respects to safety conditions.

FIG. 1 is a diagram showing an example implementation of a system for monitoring a driver's driving behaviors 100. As shown in FIG. 1, the system may include a processor 130 and non-transitory computer readable medium 140. Processing instructions may be stored in the non-transitory computer readable medium 140. The processing instructions may include processing instructions for extracting 142, which may include processing instructions, for example, for performing face tracking 143, head post tracking 144, facial expression tracking 145, gaze target analysis 146, blink tracking 147, mouth state 148, and exterior view of a car 149. The processing instructions may also include processing instructions for integration 152, which may include instructions for performing independent feature learning 153, semantic meaning development 155, and deep pose analysis 157. The independent feature learning 153 may include running regressions on independent tracked features and developing meanings of the tracked features based on the regression results. The deep pose analysis 157 may correlate two or more independent extract features and develop meanings for the correlated features. For example the deep pose analysis 157 may correlate the gaze target analysis 146 with the exterior view of a car 149 and discover the relationship between those two independent features. For each of tracked features, independent learning and deep pose analysis may be used to develop a semantic meaning. For example, by monitoring the mouth state, a semantic meaning may be discovered whether the driver is likely to talk or not to talk while he or she is driving.

As shown in FIG. 1, the system 100 may include a user interface 110 to display the result(s) of executing the processing instructions. In FIG. 1, raw video 170 is captured (or imported) by using one or more video cameras 160 to record interior and exterior views of a car while the car is driven by a driver. The captured raw video 170 may be saved in a database 190 or may be saved as video data 158 in the computer readable medium 140. The captured video data 158 may be preprocessed 159. The processor 130 may execute processing instructions to track, detect, and/or extract the preprocessed video data 158. The preprocessed video data 158 may also be used by the processor 130 while executing processing instructions for integration 153. The database 190 shown in FIG. 1 may be used to save the raw video data 170. The database 190 may also be used to save the preprocessed video data or other extracted or integrated video data results. In addition, the historically captured or processed video data may be stored in the database 190.

In FIG. 1, a data communication network 120 is used to enable the communication among the processor 130, computer readable medium 140, the user interface 110, one or more video cameras 160, and/or the database 190. The data communication network 120 may be a local bus or a local area network (LAN) such as ethernet. The data communication network 120 may also be wide area network (WAN) or a wireless network. As shown in FIG. 1, in addition to using the data communication network 120, the processor 130 and the database 190 may also directly communicate with the non-transitory computer readable medium 140.

Figure 2:
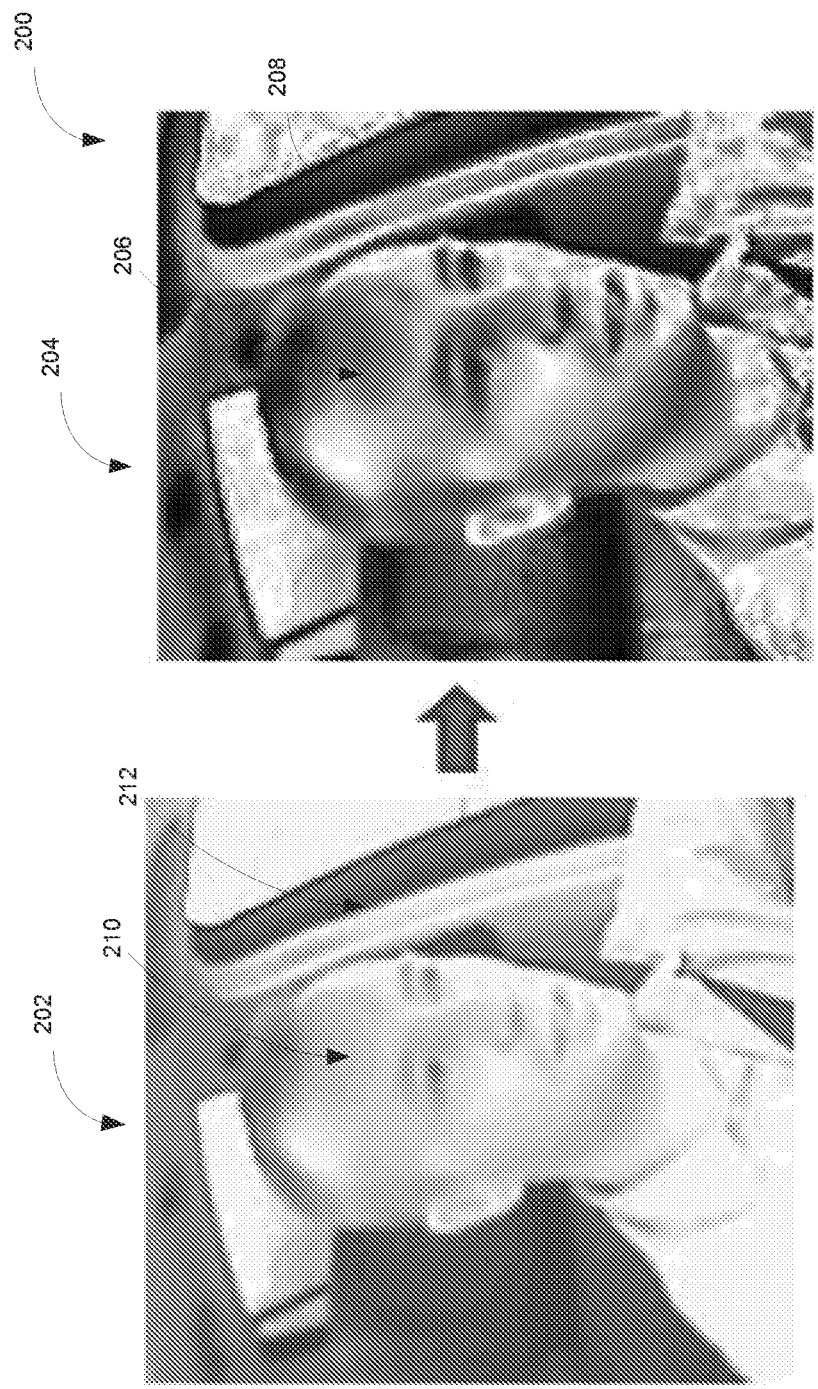
FIG. 2 illustrates an example of preprocessing captured video data.

FIG. 2 illustrates an example of preprocessing captured video data 200. As shown in FIG. 2, a captured raw video frame 202 is preprocessed to form preprocessed video 204. In FIG. 2, the contrast of the raw video is enhanced. In the captured raw video frame 202, a face area 210 and an interior of the car 212 are not heavily contrasted. After preprocessing, the preprocessed video frame 204 shows a more contrasted face area 206 and a more contrasted interior of the car 208. Sometimes, the raw video may be captured from outside of the driver's window, as the window may not be perfectly clean, in which case, the captured video may be preprocessed to remove extraneous pixels caused by the unclean window.

Figure 3:
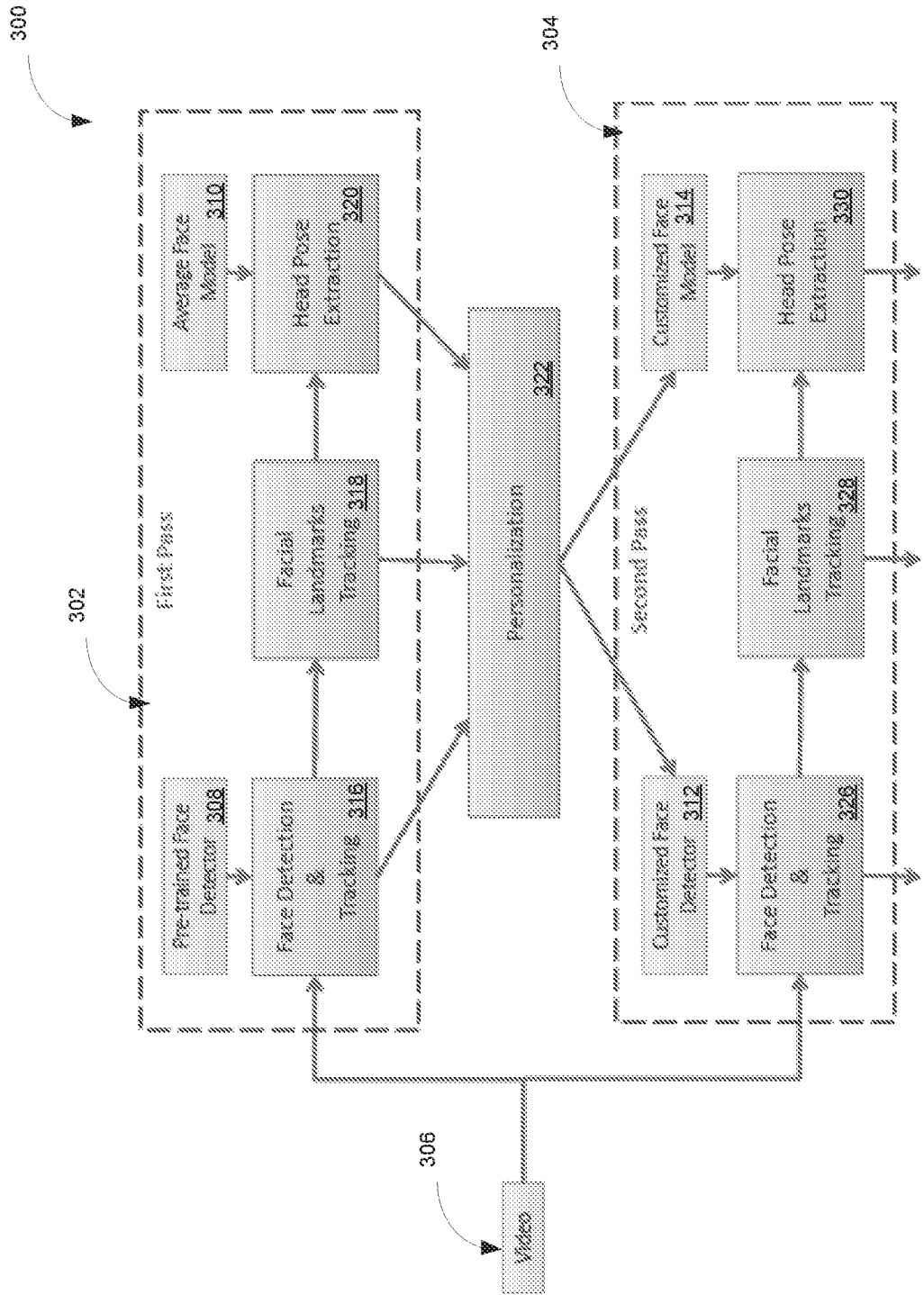
FIG. 3 illustrates an example of performing face tracking and head pose extraction.

Detection, recognition, and extraction may be performed on the preprocessed video data. As shown in FIG. 3, video data 306 may be detected and extracted for performing face tracking and head pose extraction. In FIG. 3, the face tracking 300 may be performed by performing a first pass 302 and/or a second pass 304.

A pre-trained face detector 308 may be used for face detection and tracking 316. As illustrated in FIG. 3, the pre-trained face detector 308 is developed separately from processing the video data 306. For example, by using historical data saved in the database 190, the pre-trained face detector 308 may develop one or more patterns (may also be called classifiers) for detecting and or tracking the face in the video 306. The one or more patterns may indicate where the face is likely to be under a certain driving condition. For example, the pre-trained face detector 308 may develop a pattern (or a classifier) to show a face is likely to be in the middle of the video 306 when the car is driving on the highway at a speed of 60 miles per hour.

The one or more patterns may be developed by running a regression on historical data. The pre-trained face detector 308 may run a regression by using the historical video data stored in the database 190. The pre-trained face detector 308 may also utilize a machine learning technique to develop the one or more patterns (classifiers) for detecting and/or tracking the face of the driver. As one example, the convolutional neural networks (CNN) may be used to develop one or more detectors. CNNs are trainable architectures that may be comprised of multiple stages and each stage may include multiple layers. For example, the multiple layers may include three layers of a filter layer, a non-linearity layer, and a feature layer. Input and output of each stage of CNN are sets of arrays called feature maps, and the last stage may be a fully connected multi-layer perception (MLP) for classification. The classification may be a regression that is used for developing classifiers for detectors.

An expert may annotate the classifiers. For example, the classifiers may be developed by using CNNs. The expert may annotate the classifiers to reduce the errors that may be caused by the incorrect classifiers developed by using the machine learning methods.

The developed pre-trained face detector may be used for face detection and tracking. As shown in FIG. 3, the face detection and tracking 316 is performed by applying the pre-trained face detector 308 to detect and track the captured video data 306. The pre-trained face detector 308 may develop multiple patterns or classifiers for the face detection and tracking. Based on the video 306 to be processed, one or more suitable patterns or classifiers are selected for detecting and/or extracting the face from the input video 306. For example, when the captured video 306 shows that the driver is making a phone call, a suitable pattern or classifier from the pre-trained face detector 308 may be searched and selected, and after a pattern or a classifier is retrieved, the face may be extracted from the video 306 by using the retrieved pattern or classifier.

The facial landmarks 318 may be extracted from the video 306 for tracking. The positions of fixed facial features in the face may be called facial landmarks. For example, the positions of eyes, nose, and mouth. As shown in FIG. 3, the facial landmarks, including positions of eyes, nose, and mouth, can be identified from the extracted face obtained in face detection and tracking 316.

The head pose may also be extracted 320 from the video 306. In FIG. 3, an average face model 310 is used for head pose extraction 320. The historical data stored in the database 190 may provide multiple examples of driver faces, and each driver face may be different. The average model 310 may be performed to develop a model driver face by averaging dimensions of multiple driver faces. For example, the distances between eyes for multiple drivers may be retrieved and an average distance may be calculated. Thus, the distance between eyes for the average face model 310 is obtained. The driver's head pose maintains three-dimensional angles from different directions in the middle of driving. As such, the average face model 310 may provide a three-dimensional (3D) model for extracting the driver's head from the video 306. Although driver heads and driver faces are different for different drivers, the average face model 310 provides one way to develop a model for the extraction. There may be only one model developed by using the average face model 310. In operation, the angles and the positions of the driver head may be extracted and the average face model 310 may be used to illustrate the angles and positions of the head pose. The analysis for the head pose may thus be conducted regardless of the different shapes and sizes of different faces and heads.

The head pose extraction 320 may be performed after the face detection 316 and the facial landmarks tracking 318. Even though face detection 316, facial landmarks tracking 318, and head pose extraction 320 may be performed in parallel, the processor 130 may perform the head pose extraction 320 after the face detection 316 and the facial landmarks tracking 318 are performed. As such, the obtained tracked face and facial landmark information may be used to correlate the extracted head pose 320 with the tracked face and facial landmarks. For example, it may be discovered using head pose extraction 320 that the driver maintains a certain head pose when his or her eyes are in particular positions.

The personalization information 322 may be obtained using tracked face 316, tracked facial landmarks 318, and extracted head pose 320. As shown in FIG. 3, tracked face information 316, facial landmarks information 318, and head pose information 320 are fed to personalization 322 for developing personalization information for the driver. The personalization information may include where the face is located in the middle of driving, positions of features on the face, and angles and positions of the driver's head pose. As shown in FIG. 3, the personalization information may be used for customizing the face detector 312 and customizing the face model 314.

The personal identity may be generalized when tracking driver's behaviors. The driver may not be willing to reveal his or her identity when driving activities and behaviors are tracked. Furthermore, revealing a driver's identity while tracking the driving behaviors may cause security issues for the driver. As such, it may be important to hide the identity of the driver when tracking driver's driving activities and behaviors. One way to hide the driver's identity is to generalize the driver's identity. For example, the driver's identity may be generalized when his or her head is replaced with an avatar in the video. The obtained personalization information 322 may be used to recognize the positions of the face, learn the facial landmarks, and understand the head pose of the driver. Thus, the obtained personalization information may be transferred to the avatar and the avatar may preserve driver's facial activities and head movements after the driver's head is replaced in the video. Generalization of a driver's identity using an avatar will be discussed in greater detail hereinafter.

As shown in FIG. 3, there may be a second pass 304 for performing the face detection, facial landmark tracking, and head pose extraction. The second pass 304 may follow the first pass 302. Alternatively, the second pass 304 may begin after the first pass 302 begins, but before the first pass 302 ends. As the personalization information 322 is developed using data from the face detection 316, facial landmark tracking 318, and head pose extraction 320 that are developed in the first pass 302, in some embodiments, the second pass 304 may not be conducted in parallel with the process in the first pass 302.

The collected personalization information 322 may be used to develop a customized face detector 312 and a customized face model 314 for the second pass 304. After learning the driver head movements and facial activities, the customized face detector 312 may be developed. The machine learning methodology that is used to develop the pre-trained face detector may also be used to develop the customized face detector 312. One or more patterns or classifiers for the driver's face may be developed using the customized face detector 312. The personalization data 322 that are collected from the first pass 302 are used for developing the one or more patterns or classifiers. In some embodiments, the customized face detector 312 may also be used to generalize the driver's identity, for example, by replacing the driver's head with an avatar. The driver's head movements and facial activities obtained from the first pass 302 and stored in the personalization 322 may be transferred to the avatar. The driver's head movement and facial activities are thus preserved after the driver's head is replaced with the avatar. More details for replacing the driver's head with an avatar will be described below. The developed customized face detector may be used for face detection and tracking 326 in the second pass 322 when processing input video 306.

The customized face model 314 may also be developed. As shown in FIG. 3, the customized face model 314 may be developed by using the personalization data 322. Compared with the average face model 310 used in the first pass 302, the customized face model is developed by using the face tracking, facial landmarks, and head pose obtained from the first pass 302. Thus, the customized face model 314 may be more accurate than the average face model 310 used in the first pass 302 for processing the input video 306.

Figure 21:
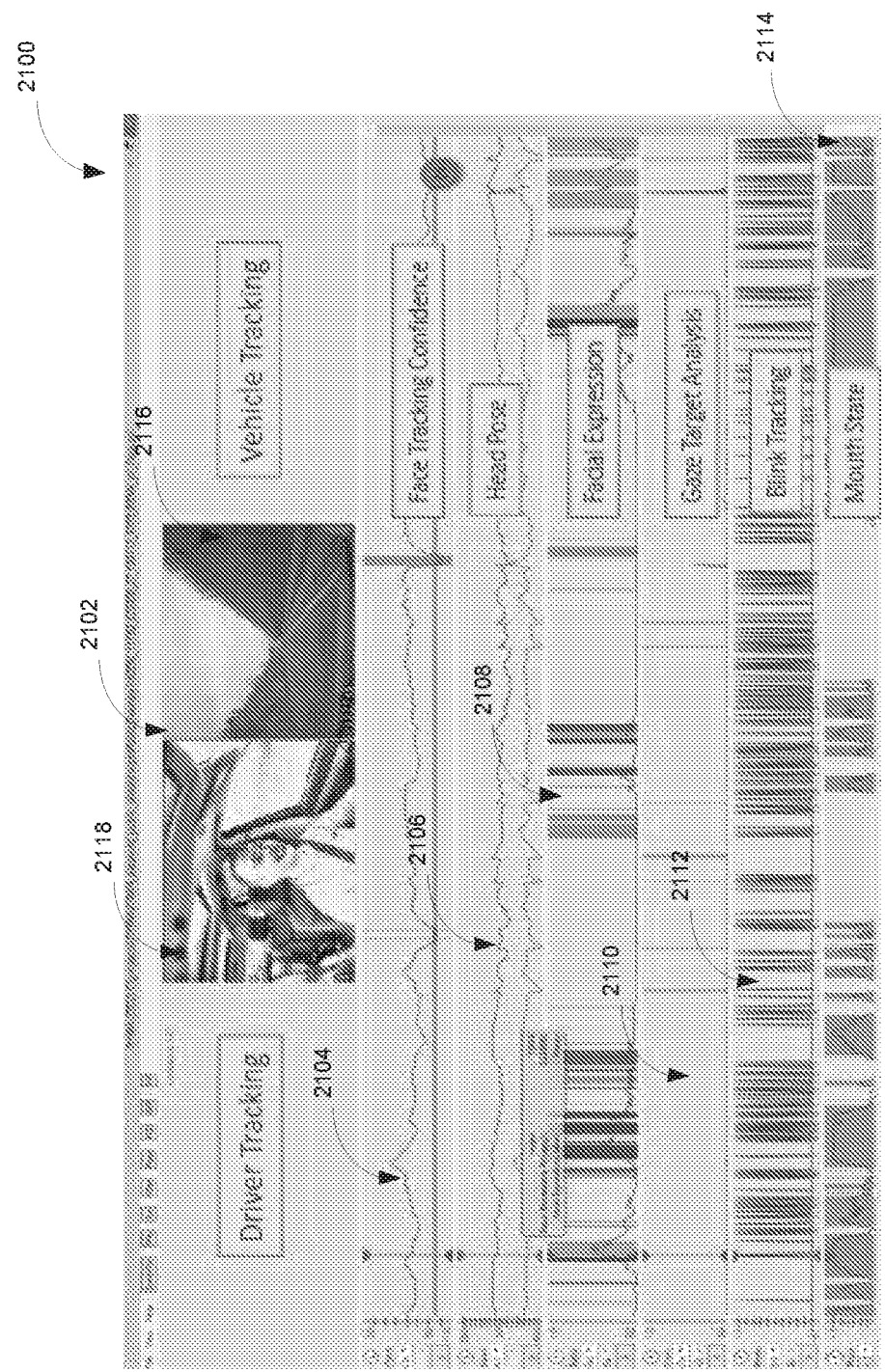
FIG. 21 shows an example of a user interface that displays a visualization representation of extracted video features from video.

As shown in FIG. 3, the tracked face 326, tracked facial landmarks 328, and extracted head pose 330 may output the extracted result. The extracted result of the tracked face 326, tracked facial landmarks 328, and extracted head pose 330 may be displayed in the user interface 110. An example display of the extracted result is shown in FIG. 21.

Figures 4A, 4B:
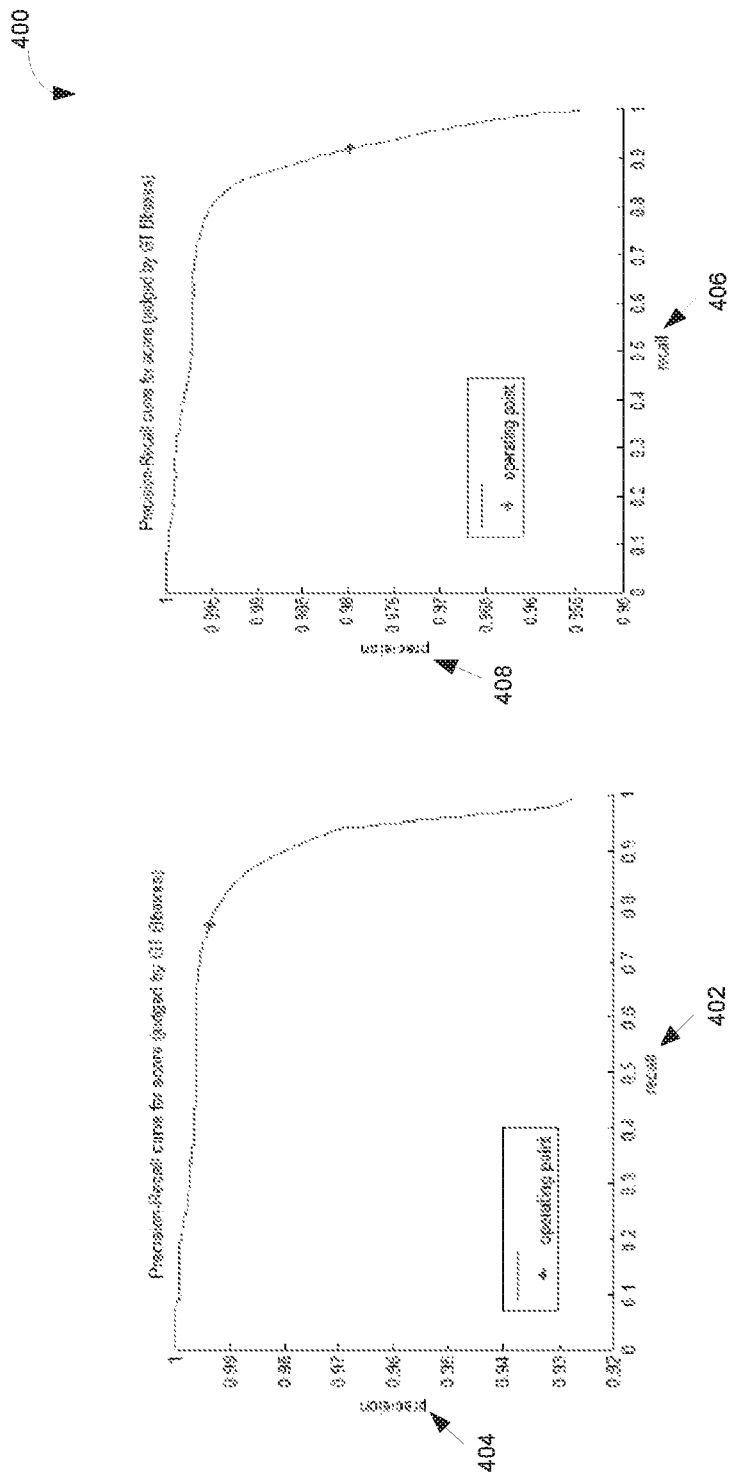
FIGS. 4A and 4B depict a precision-recall curve for a face detection.

FIGS. 4A and 4B depict precision-recall curves for face detection 400. In precision-recall analysis, precision is the fraction of relevant instances that meet a certain condition or a threshold, while recall is the fraction of all relevant instances. In FIG. 4A, the recall 402 shows a fraction of detectable faces among all detected video frames. As shown in FIG. 4A, at the operation point, the recall for the face detection in the first pass is 79.58%, which indicates that 79.58% of the faces in all video frames of video 306 can be detected in the first pass 302. In FIG. 4B, at the operation point, a recall 406 for the face detection in the second pass is 96.06%, which indicates that 96.06% of the faces in all video frames of the video 306 can be detected in the second pass 304. As such, the detection process in the second pass 304 can detect substantially more faces than the detection process in the first pass 302.

Figure 5:
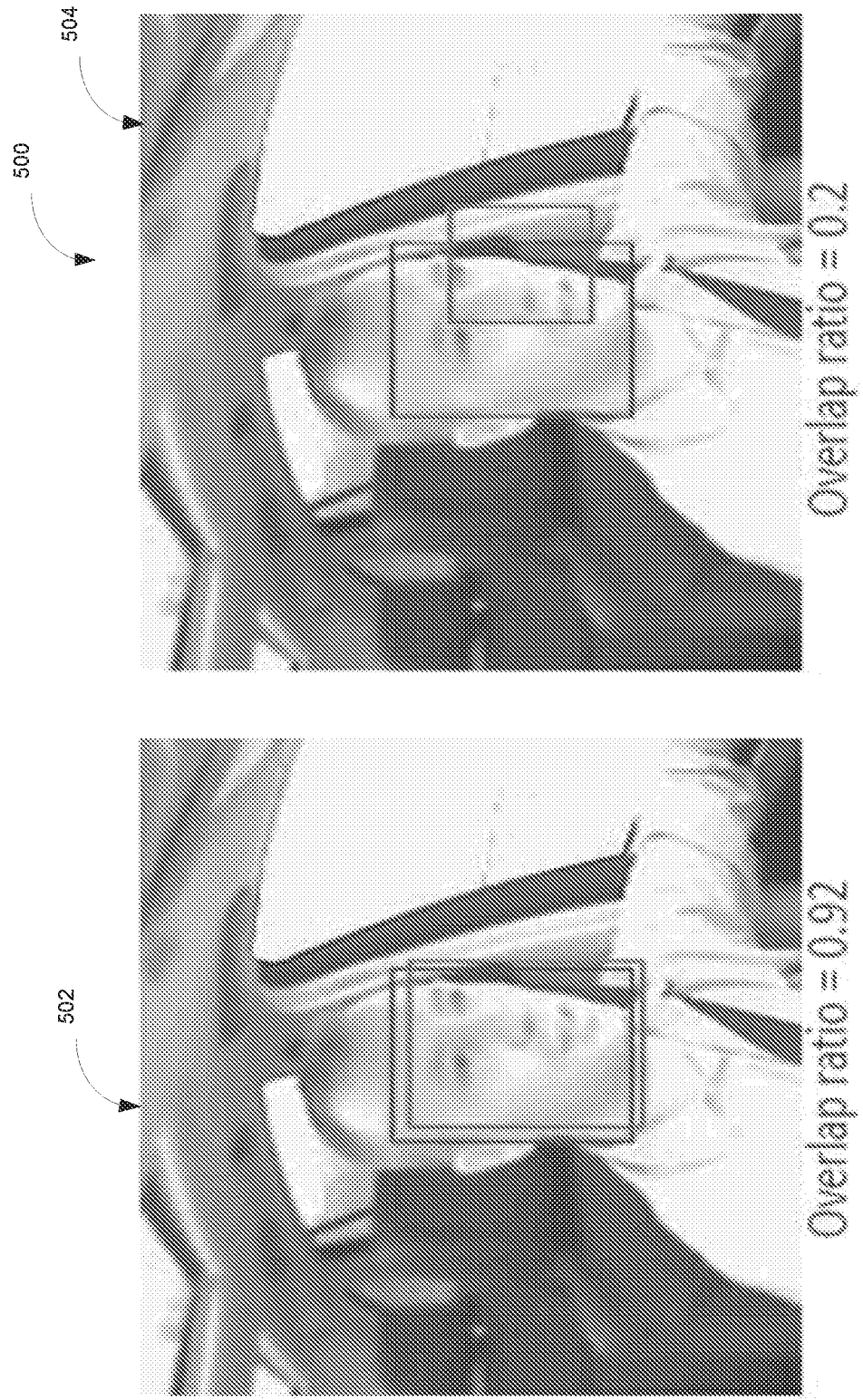
FIG. 5 illustrates a determination of the overlap ratio.

However, at the operation point, the first pass 302 shows a little higher precision face detection rate than the second pass 304. An overlap ratio is used as the threshold for determining the precision for both the first pass 302 and the second pass 304. FIG. 5 illustrates the determination of the overlap ratio 500. The overlap ratio may be calculated using the formula 1 shown below. As illustrated in Formula 1, the overlap ratio is the smaller ratio of the ratio of the overlap area over the area of generated box and the ratio of the overlap area over the area of detected box. As shown in FIG. 5, the overlap ratio for the left face detection 502 is 0.92 and the overlap ratio for the right face detection 504 is 0.2. In FIGS. 4A and 4B, The precision is calculated when the overlap ratio is greater equal than 0.5. Thus, as shown in FIGS. 4A and 4B, the precision 404 of the face detection for the first pass is 99.26%, which indicates that 99.26% of faces can be detected in the first pass among all video frames having an overlap ratio that is greater equal than 0.5, and the precision 408 of the face detection for the second pass is 96.54%, which indicates that 96.54% of faces can be detected in the second pass among all video frames having an overlap ratio that is greater equal than 0.5. Therefore, for those video frames having an overlap ratio that is greater equal than 0.5, the face detection for the first pass is 99.26% and the face detection for the second pass is 96.54%. The first pass detects faces a little more precisely than the second pass in the precision analysis.

Overlap ratio=min(area of overlop/area of generated box, area of overlap/area of detected box)  FORMULA 1:

Table 1 below shows face detection performance summary. Table 1 shows comparisons of face detections in the first pass and the second pass when different types of video data 306 are used. As illustrated in Table 1, high resolution (hi-res) video and low resolution (lo-res) videos are used in the comparison. In Table 1, hi-res refers to videos having a resolution of 720×480, and lo-res in 1× refers to videos having the resolution of 356×240. The lo-res video may be rescaled to 2× lo-res video in the run time which has the resolution of 712×480. As shown in Table 1, the use of hi-res videos can achieve 79.34% success rate, which means 79.34% of face detections having a overlap score that are greater equal than 0.5 in the first pass. In Table 1, for hi-res in the first pass, the median overlap score of face detection for hi-res videos is 0.38, the recall is 79.58%. Those figures are significantly higher than those of lo-res in 1× in the first pass. As shown in Table 1, the use of hi-res videos and lo-res videos in 2× can provide more precise overall face detections than the use of lo-res in 1×.

Figure 6:
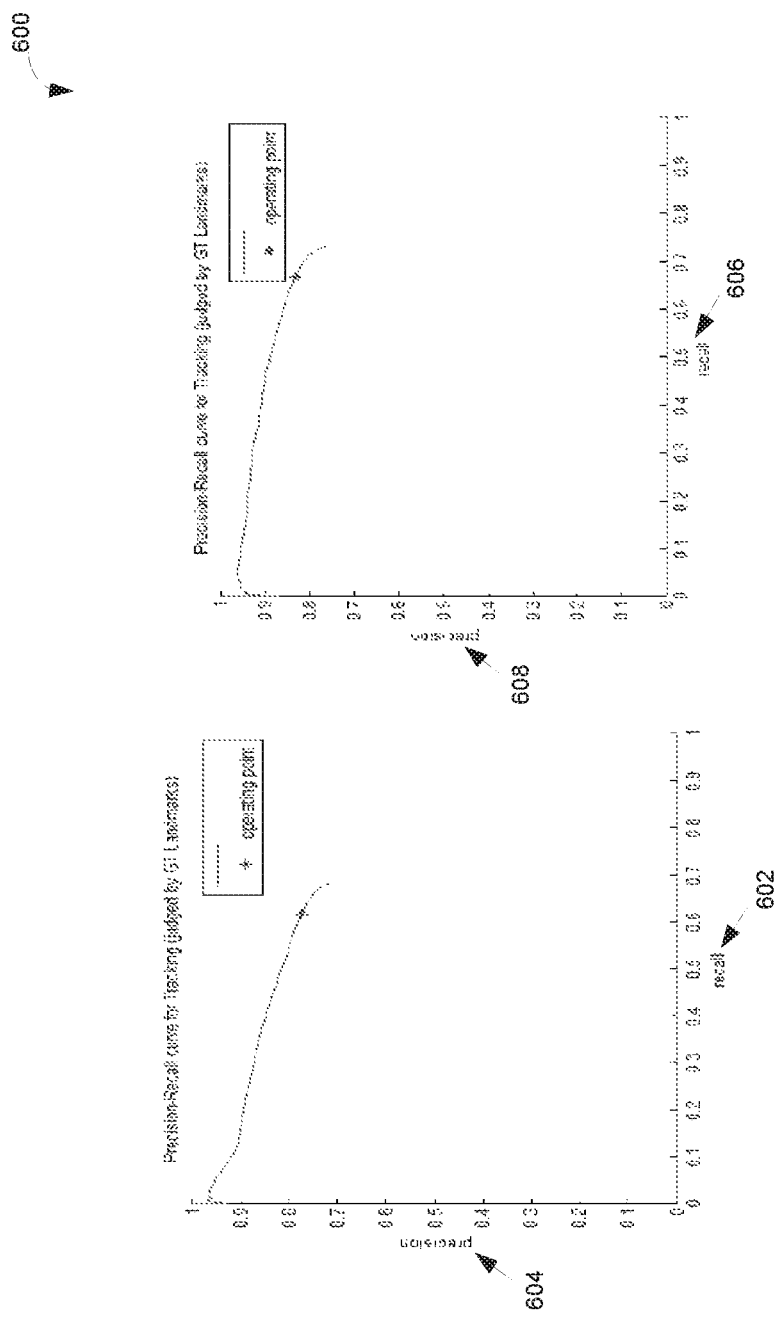
FIGS. 6A and 6B show precision-recall curves for tracking facial landmarks.

FIGS. 6A and 6B depict precision-recall curves for tracking facial landmarks 600 of the first pass 302 and the second pass 304. As shown in FIG. 6A, a recall 602 of the first pass 302 for tracking facial landmarks at the operating point is 61.61%, which indicates that, at the operating point, 61.61% of facial landmarks in the video 306 can be tracked in the first pass 302. In FIG. 6B, a recall 606 of the second pass 304 for the face detection at the operating point is 80.27%, which indicates that, at the operating point, 80.27% of facial landmarks in the video 306 can be tracked in the second pass 304. According to the recall figures, the second pass 304 can successfully track substantially more facial landmarks than the first pass 302.

TABLE 1

Face detection performance summary

| Dataset | Approach | Success Rate | Median Score | Precision | Recall |
|---|---|---|---|---|---|
| hi-res | First Pass | 79.34% | 0.38 | 99.26% | 79.58% |
| | Second Pass | 95.66% | 1.45 | 96.54% | 96.06% |
| lo-res | 1X First Pas | 67.22% | 0.07 | 99.64% | 64.19% |
| | 2X First Pass | 79.52% | 0.37 | 99.14% | 77.45% |
| | 2X Second Pass | 93.49% | 1.17 | 98.82% | 92.47% |

Figure 7:
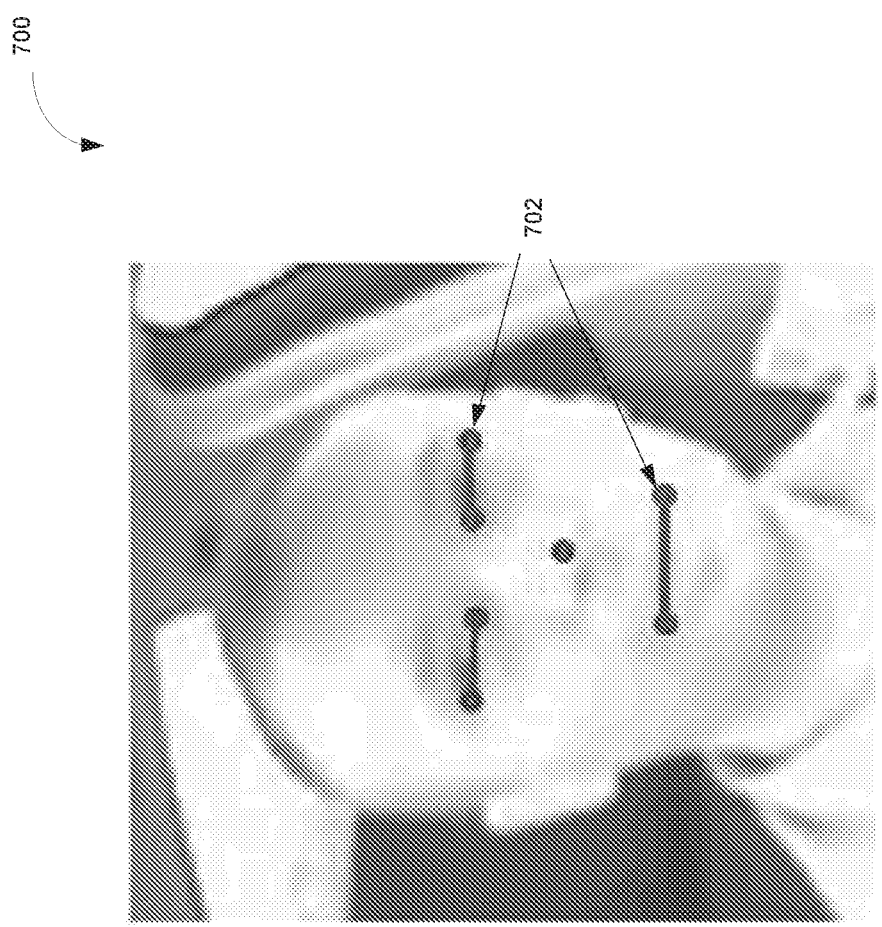
FIG. 7 depicts an example of seven annotated points for tracking facial landmarks.

The first pass 302 and the second pass 304 may not show much difference for successfully tracking facial landmarks when the success criteria are met. The mean tracking error per frame may be calculated by obtaining the mean value of pixel distance between the 7 annotated points and corresponding tracked points. FIG. 7 shows an example of seven annotated points 700. As shown in FIG. 7, the seven annotated points 702 may be marked. One possible way to create annotated points is to annotate the image manually. For example, an expert in the field may utilize an image processing tool to annotate the image to create the annotated points. After the mean tracking error per frame is available, the mean normalized tracking error may be defined by dividing the mean tracking error by the intraocular distance. The success criteria are met when the detection score is greater than 0.3 and the normalized tracking error is less than 0.15. As shown in FIGS. 6A and 6B, the precision for tracking facial landmarks when the success criteria are met is 77.42% in the first pass 302, and is 72.11% for tracking facial landmarks in the second pass 304.

TABLE 2

Summary of performance for tracking facial landmarks

| Dataset | Approach | Precision | Recall |
|---|---|---|---|
| hi-res | First Pass | 77.4% | 61.6% |
| | Second Pass | 72.1% | 80.3% |
| lo-res | 1X First Pass | 51.9% | 32.9% |
| | 1X Second Pass | 39.2% | 38.6% |
| | 2X First Pass | 65.4% | 49.1% |
| | 2X Second Pass | 69.1% | 71.6% |

Table 2 shows a summary of performance for tracking facial landmarks. As shown in Table 2, the tracking performance is not very good by using low resolution videos in 1X. In the first pass 302, Table 2 shows the precision for the lo-res is 51.3% and recall is merely 32.9%. However, the performance improves after rescaling the low resolution videos from 1X to 2X. As shown in Table 2, the precision for 2× lo-res videos in first pass 302 is 65.4% and recall is 49.1%. Those figures are significantly higher than the result of using 1× lo-res video. Also, as shown in Table 2, the performance for 2× lo-res video is still about 10% below the performance of high resolution videos (hi-res).

Figure 8:
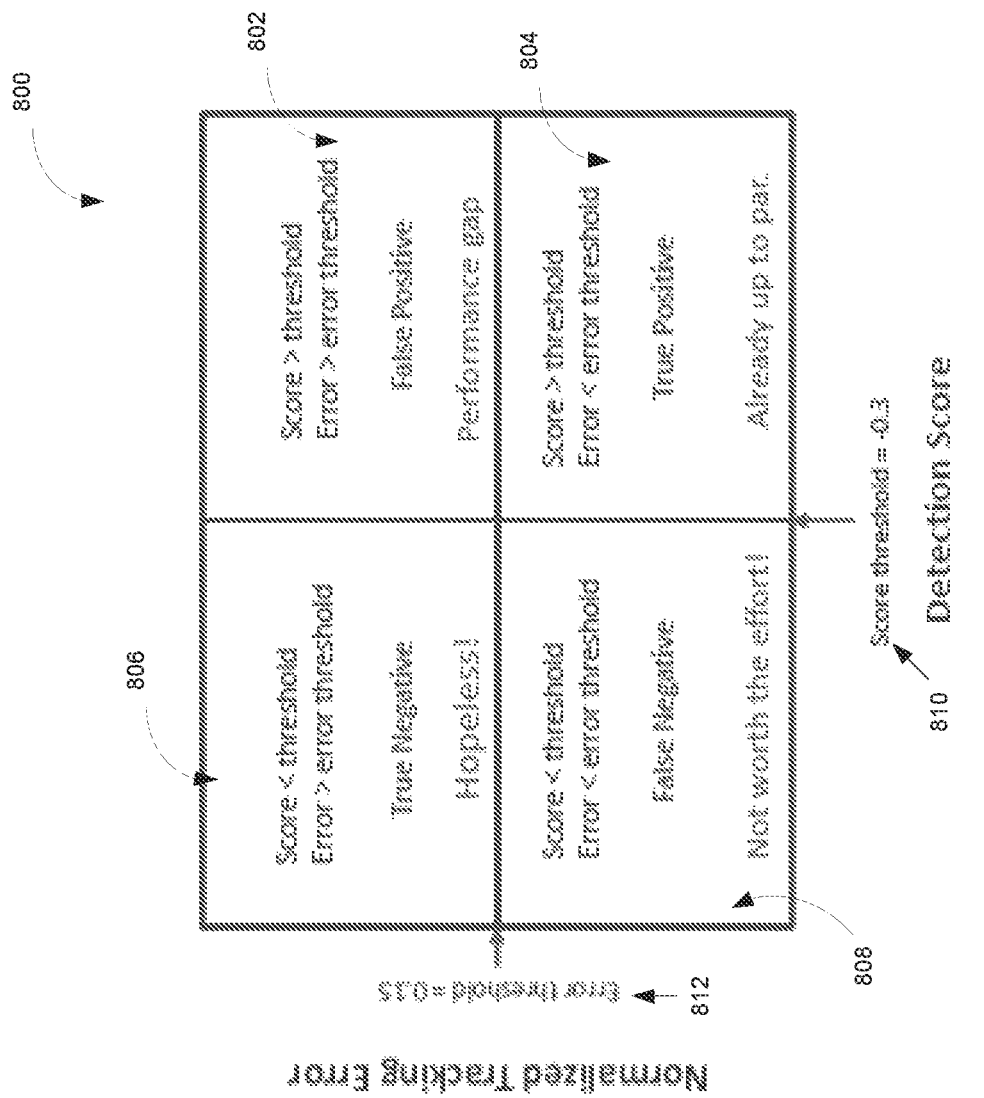
FIG. 8 depicts a performance analysis quad chart for tracking facial landmarks.

The detection score and error for tracking facial landmarks may be further analyzed. FIG. 8 shows a performance analysis quad chart for tracking facial landmarks 800. As shown in FIG. 8, the score threshold 810 is −0.3 and the error threshold 812 is 0.15. As shown in the right lower quad 804, when the score is greater than the score threshold −0.3 and the error is less than error threshold 0.15, the result of tracked facial landmarks is truly positive. In the right upper quad 802, when the score is greater than the score threshold −0.3 and the error is greater than error threshold 0.15, the result of tracked facial landmarks is falsely positive. Under this situation, even though the result appears ok, but there may be too many errors. In the left lower quad 808, when the score is less than the score threshold −0.3 and the error is also less than error threshold 0.15, the result is falsely negative. Even though there are not too many errors in this scenario, the result is bad. In the left upper quad 806, when the score is less than the score threshold −0.3 and the error is greater than error threshold 0.15, the result is truly negative. In this situation, the result is bad and there are too many errors. The quad chart 800 may show different perspectives for the result of tracking facial landmarks.

Figure 9:
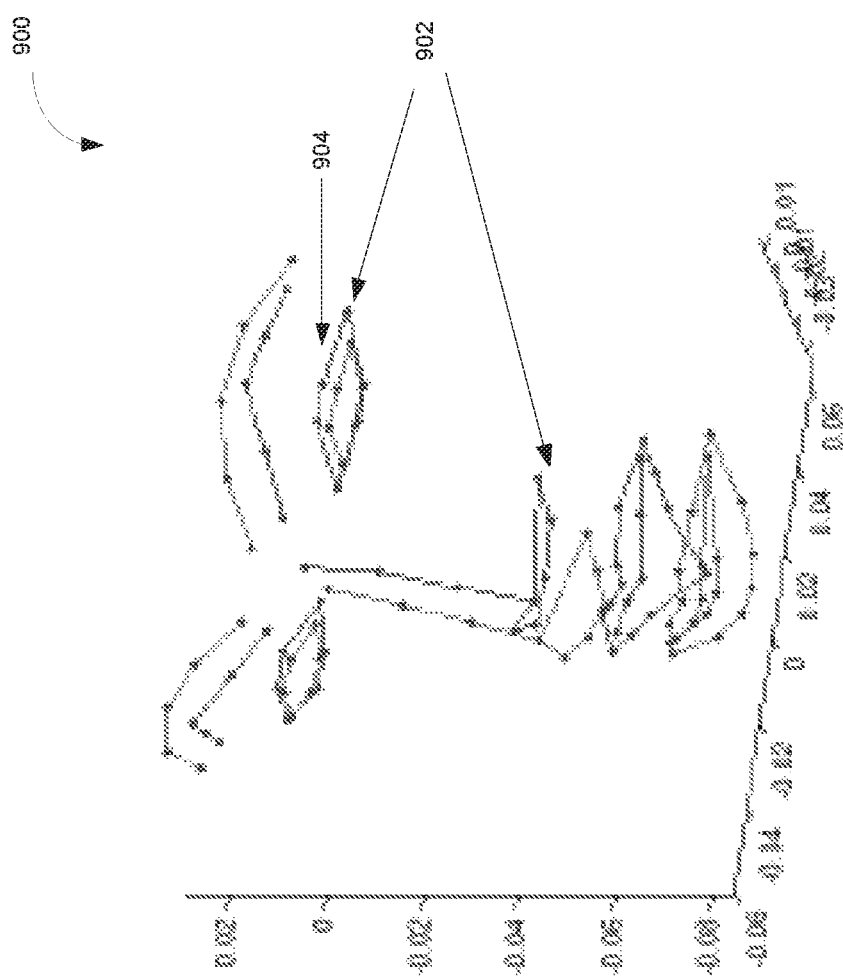
FIG. 9 depicts an example of an average face model.

The average model 310 may be constructed before extracting head pose 320 in the first pass 302. FIG. 9 shows an example of an average face model 900 that may be used in the first pass 302. As shown in FIG. 9, a model face 900 is developed. In FIG. 9, dimensions of eyes and noses 902 and other features on the face and distances between two identified positions 904 are shown in a 3D model. Dimensions 902 and distances 904 on the model may be derived by averaging dimensions and distances of multiple available faces from historical data retrieved from database 190. The derived average model 900 may be used for head pose extraction 320 in the first pass 302 in FIG. 3.

Figure 10:
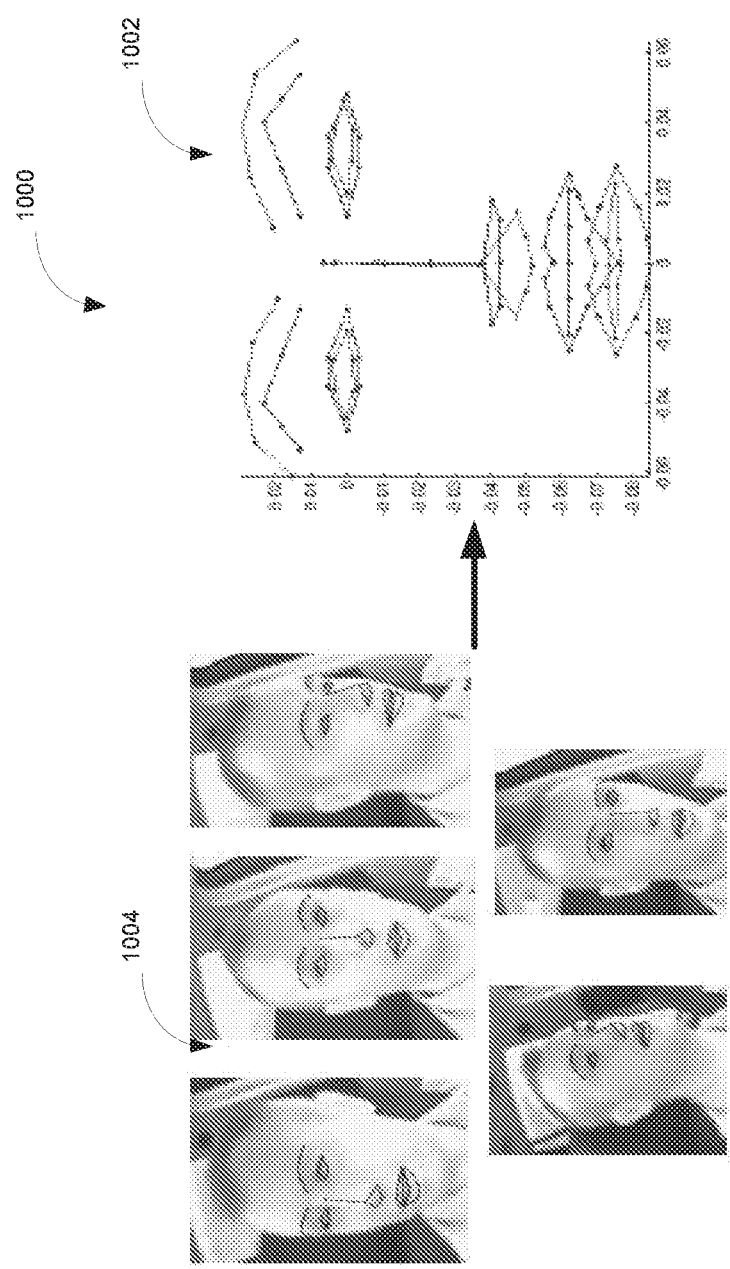
FIG. 10 illustrates an example process for developing a customized face model.

The customized face model used for head pose extraction 330 may be developed by using data collected in the first pass 302. FIG. 10 illustrates an example process for developing a customized face model 1000. In FIG. 10, facial landmarks in different poses 1004 for a driver are collected in the first pass 302. The customized face model 1002 is developed using the facial landmarks collected in different poses 1004 in the first pass 302.

Figure 11:
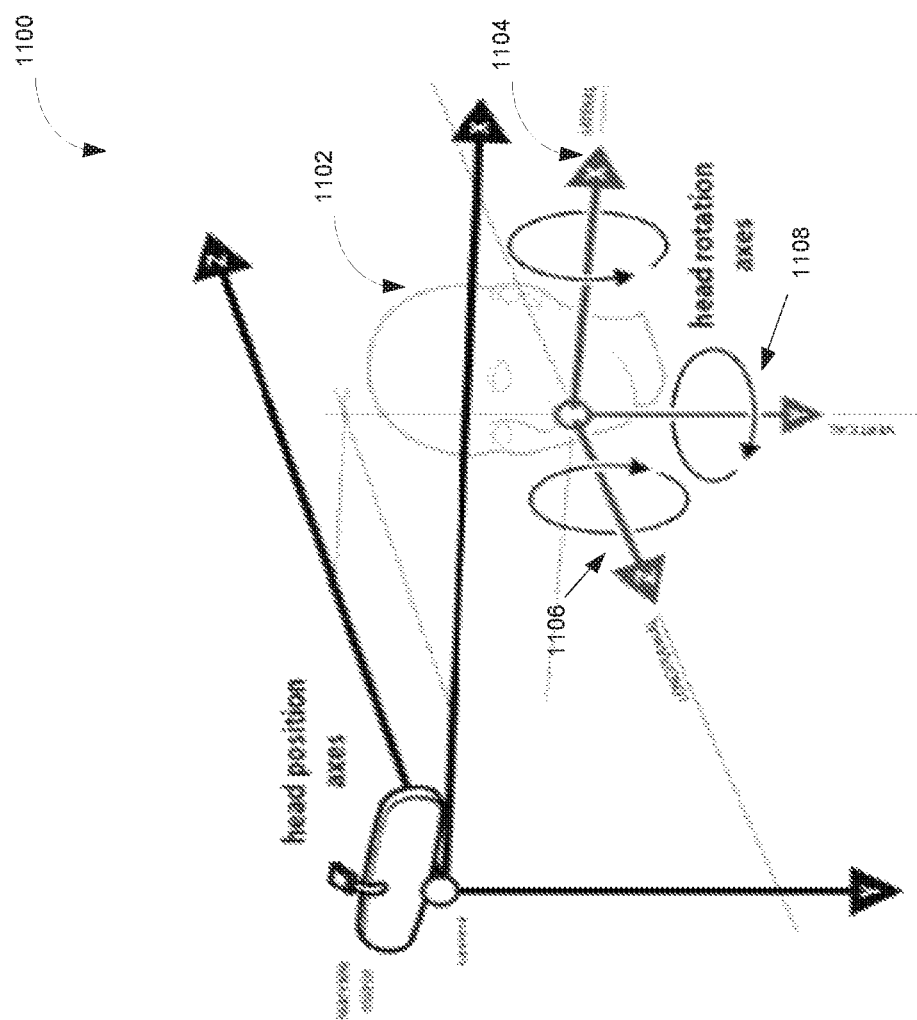
FIG. 11 shows an example of three-dimensional tracking for a head/face pose inside a vehicle.

A three-dimensional tracking for the tracked head/face pose inside a car may be performed. FIG. 11 shows an example of a three-dimensional tracking for the head/face pose inside a car. In FIG. 11, the face model 1102 may be constructed by either the average face model 310 or the customized face model 314. The lateral 1104, longitude 1106, and vertical 1108 movements of the face model 1102 extracted from the video 306 are tracked as shown in FIG. 11.

Figure 12:
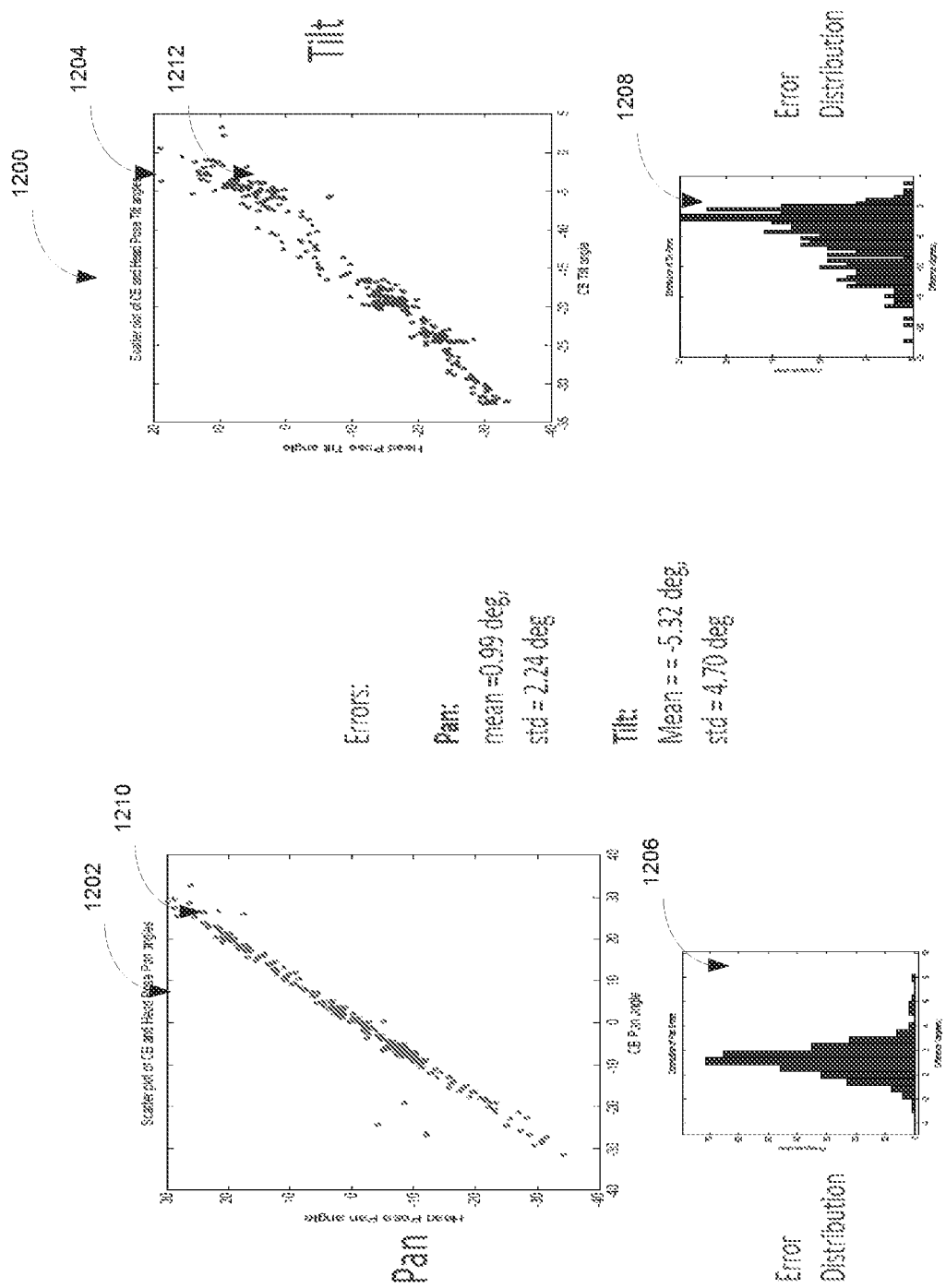
FIG. 12 shows an example error analysis for a pan angle and a tilt angle.

The accuracies of head pose tracking may be evaluated. FIG. 12 shows an example error analysis for a pan angle 1202 and a tilt angle 1204. The pan angle refers to the rotation of an object horizontally from a fixed position and the tilt angle refers to the rotation of an object up and down from the fixed position. The correlations of movements of tracked head pose and the face model in pan angle are shown in scatter plots 1210 in the pan angle analysis 1202. The correlations of movements of tracked head pose and the face model in tilt angle are shown in scatter plots 1212 in the tilt angle analysis 1204. FIG. 12 also shows the error distribution for pan angle analysis 1206 and tilt angle analysis 1208.

Figure 13:
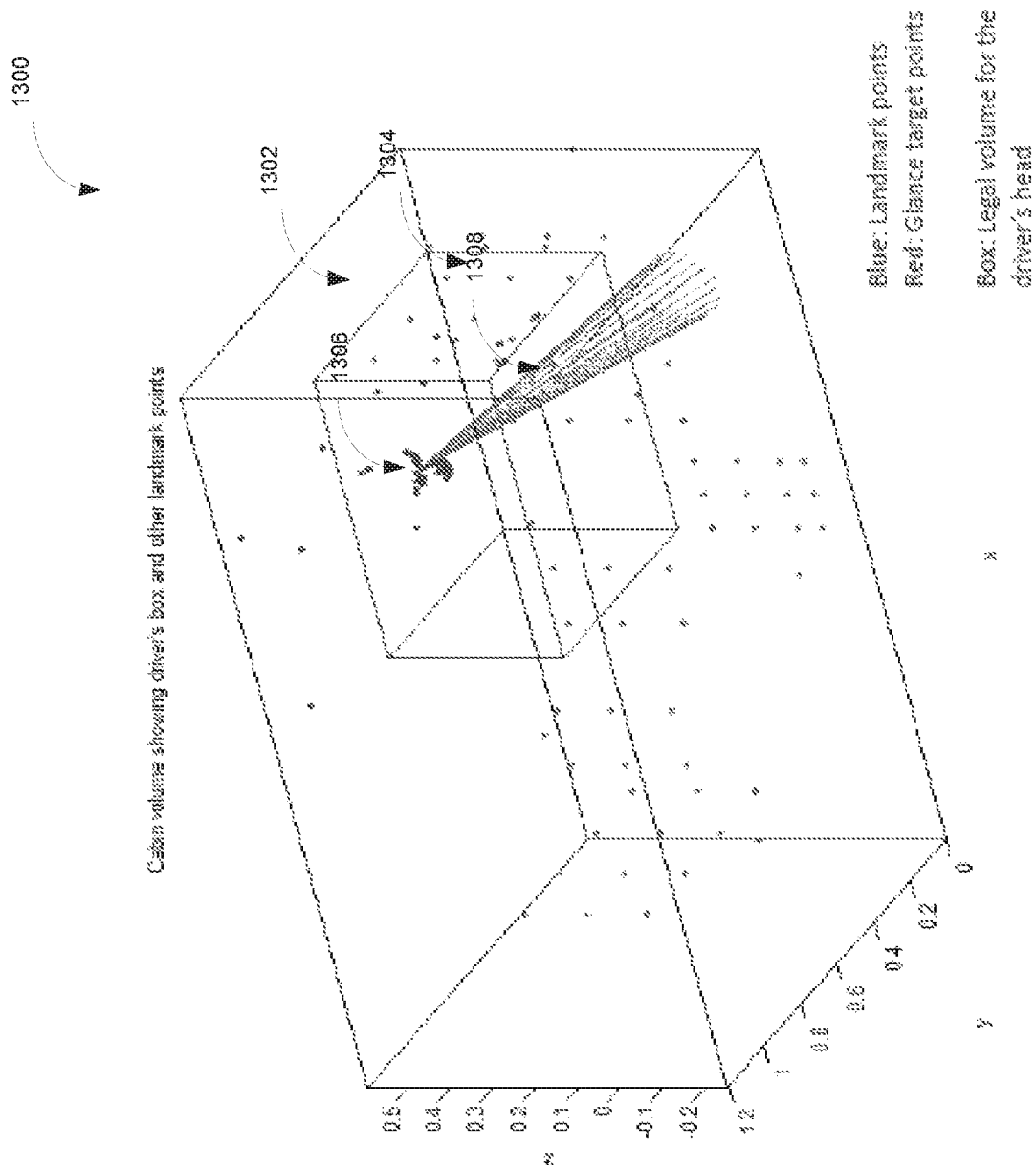
FIG. 13 illustrates the use of head/face pose to computer 3D glance target vectors.

In analyzing driving behaviors, it is important to track a glance target of the driver. For example, the driving of the car is greatly affected by where the driver is looking. However, even though the video captured may show the head and face pose, the video may not directly display the glance target. As such, it may be useful to derive the glance target of the driver by using the head and face pose extracted from the video. For example, the glance directions may be estimated and derived by corresponding the head pose angle with a front facing direction of the driver. Also, recognizable features such as cell phone or outside views of the car may be extracted from the captured video and may be annotated. The 3D coordinates of the extracted features may be developed. As such, the glance targets may be developed by associating the glance directions and recognizable features. FIG. 13 illustrates the use of head/face pose to computer generate 3D glance target vectors 1300. As shown in FIG. 13, a big 3D box 1302 is used to illustrate the cabin of the car. Additionally, a smaller 3D box 1304 inside the big 3D box 1302 represents a volume for the driver's head. The blue points 1306 inside the big 3D box 1302 represent the landmark points and the red points 1308 represent the glance target points according to the obtained head/face pose. As shown in FIG. 13, a majority of blue points 1306 construct a rough face including eyes, noses. and mouth and the majority of the red points 1308 indicate that the driver gazes forward of the car cabin 1302.

TABLE 3

Evaluation of Glance Tracking
Glance Target Detection Accuracies

Class 2, accuracy = 1.13%
Class 3, accuracy = 0.06%
Class 4, accuracy = 86.31%
Class 6, accuracy = 0.85%
Class 12, accuracy = 23.57%
Class 13, accuracy = 0.97%
Class 14, accuracy = 27.12%

Figure 14:
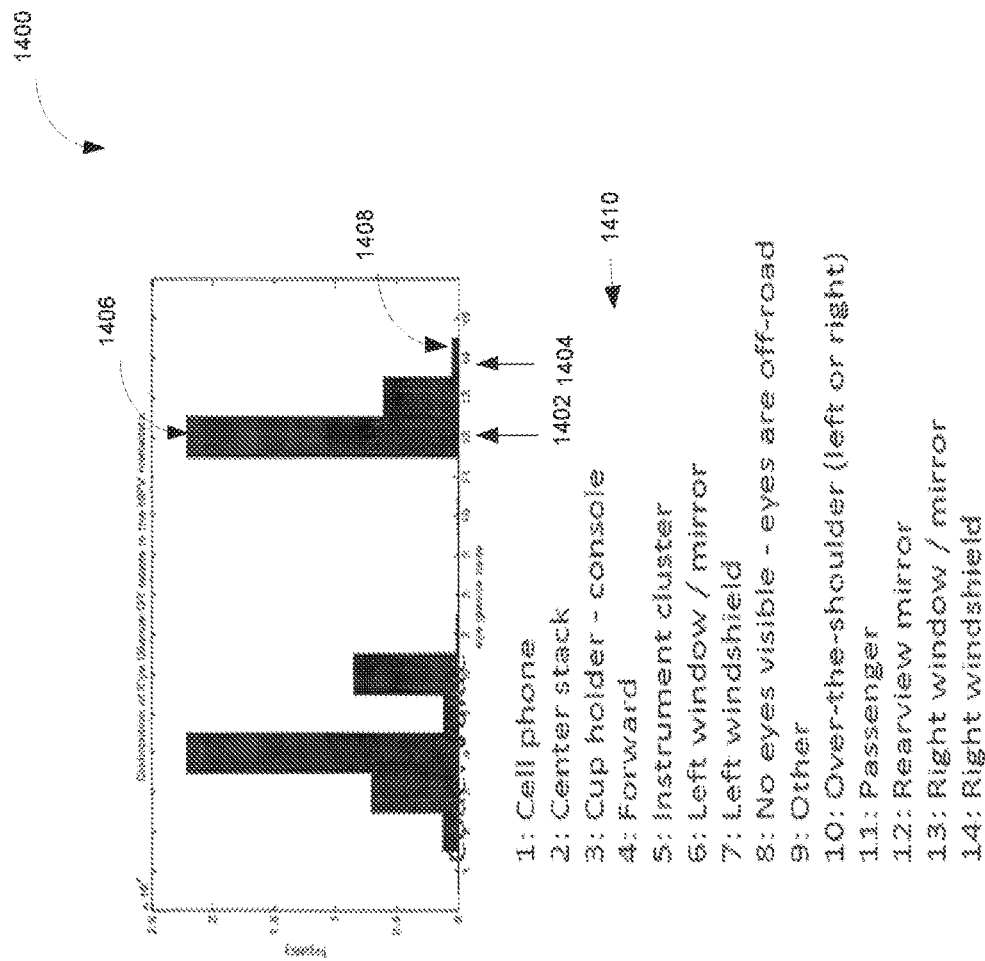
FIG. 14 illustrates an example showing frequencies for a number of glance targets.

FIG. 14 illustrates an example showing frequencies for a number of glance targets 1400. In FIG. 14, a high bar 1406 represents a frequency for rearview mirror as the glance target, and a low bar 1408 represents a frequency for right windshield as the glance target. As shown in FIG. 14, the frequency at which the driver gazes at the rearview mirror 1402 is much higher than the frequency at which the driver gazes at the right windshield 1404. Table 3 shows an evaluation of glance tracking accuracies for a list of targets 1410 shown in FIG. 14. In Table 3, the glance tracking accuracy for class 4—forward—is 86.31% and the glance tracking accuracy of class 3—cup holder—is 0.06%. Thus, according to Table 3, the glance tracking for forward (class 4) is much more accurate than the glance tracking for cup holder (class 3).

Figure 15:
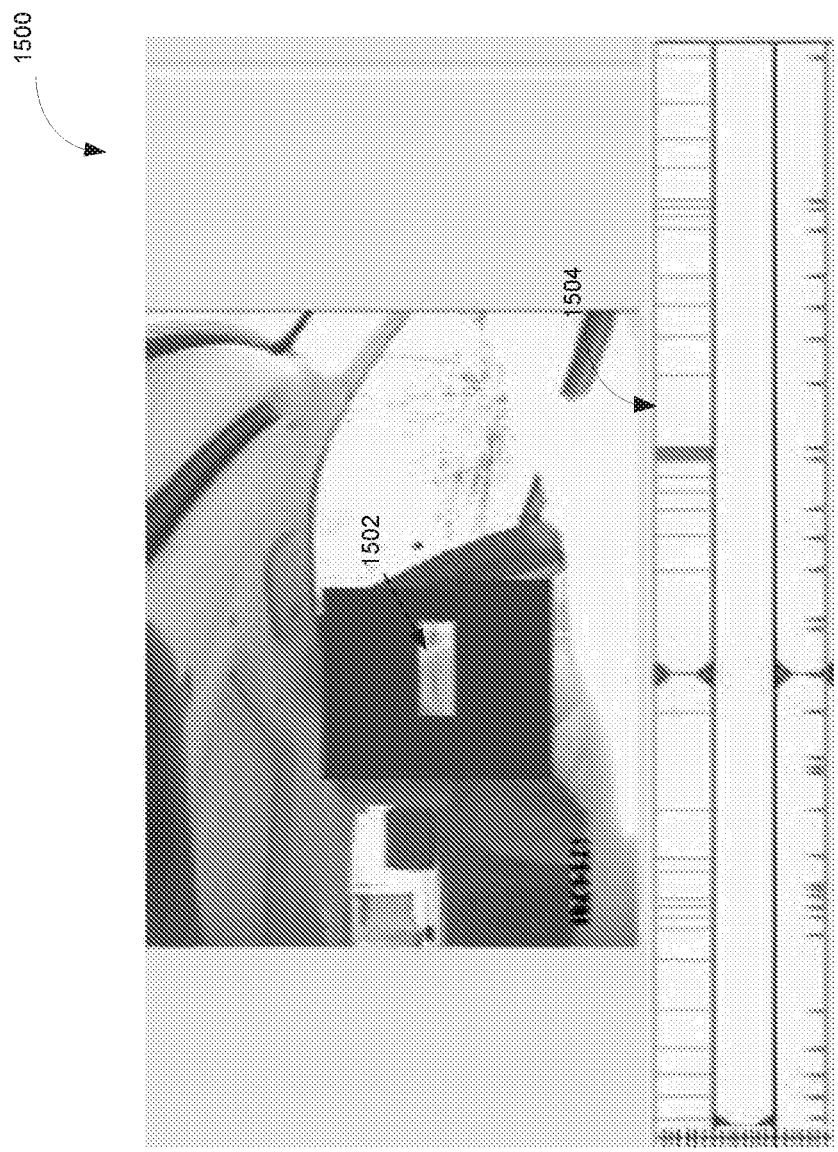
FIG. 15 shows an example of eye blink detection and blink-rate estimation.

Driver's eye blink may also be detected and monitored. FIG. 15 shows an example of eye blink detection and blink-rate estimation. As shown in FIG. 15, the eye blink can be detected based on tracked landmark features 1502. In addition, the videos can be annotated and the annotated videos 1504 can be evaluated for monitoring eye blinks.

Figure 16:
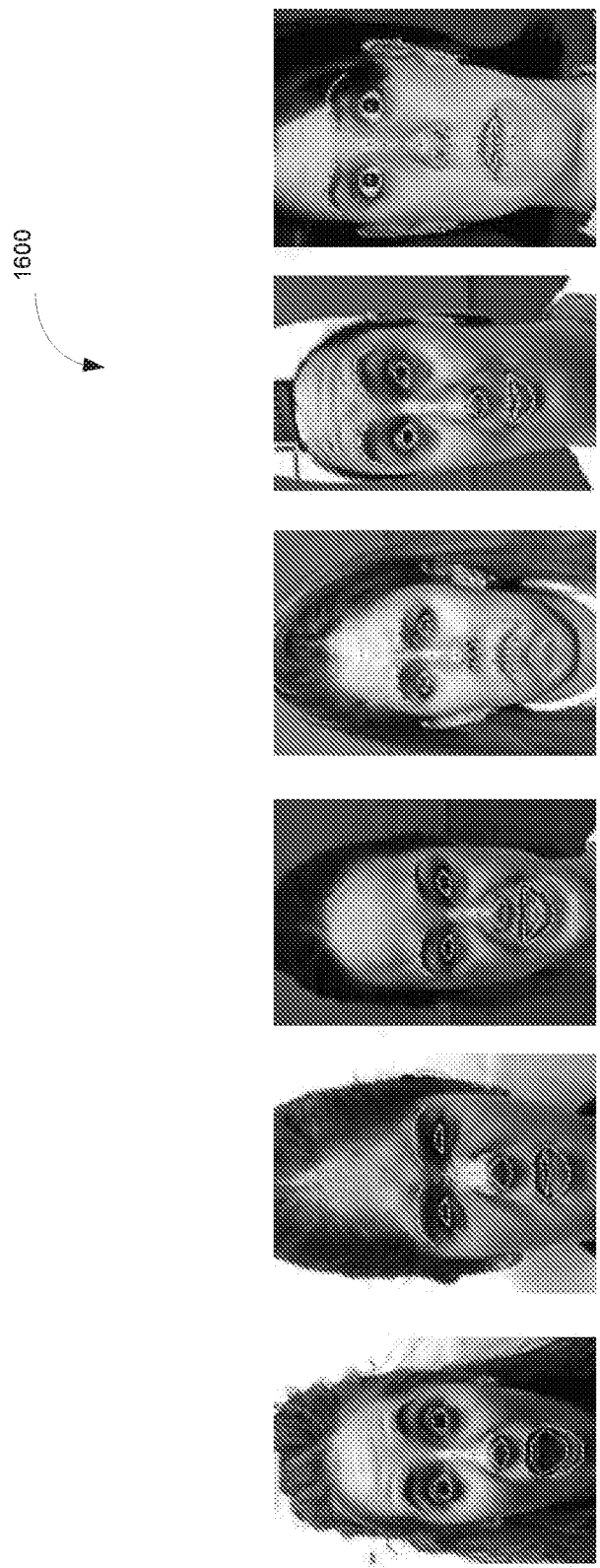
FIG. 16 shows examples of six different facial expressions that are constructed based on obtained videos.

The driving behavior tracking may also include facial expression analysis. There may be several facial expression classes including neutral, angry, contempt, disgust, fear, happy, sadness, surprise, or any other facial expressions. The facial expression analysis may be conducted for frontal faces. Thus, the tracked faces may be adjusted and rotated to project them to a fronto-parallel plane before the analysis is performed. FIG. 16 shows examples of six different facial expressions that are constructed based on obtained videos. Qualitatively, the "happy" expression seems to arise when the drivers are chatting with a person in the passenger's seat.

Figure 17:
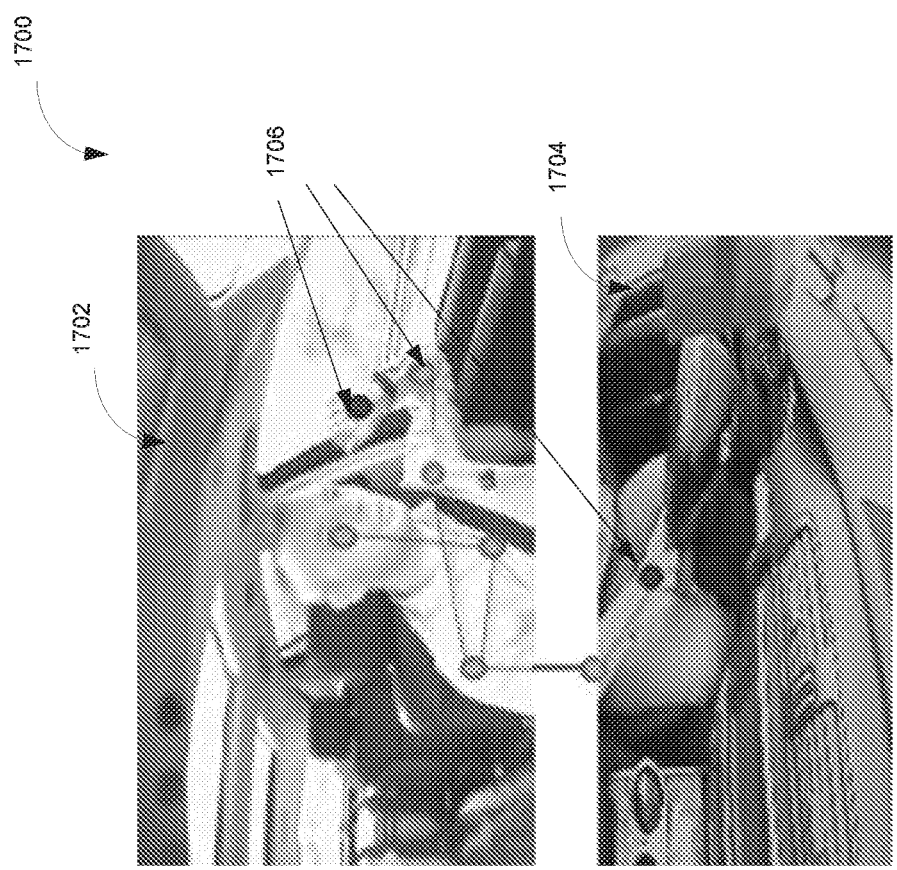
FIG. 17 depicts an example for tracking upper body joints and hands.

The driver's hands and upper body pose may be tracked and extracted for driving behavior analysis. As shown in FIG. 17, the upper body joints and hands are tracked 1700. Sometimes, when a driver's hand shows in different video frames, the different video frames may be correlated in order to obtain complete tracked data. For example, in FIG. 17, tracked points for hands can be found in both the upper video frame 1702 and the lower video frame 1704. Thus, both video frames need to be correlated to track and extract the whole set of information for a driver's hands.

Sometimes, unrelated events may be correlated for developing important information for analyzing driving behaviors. For example, the facial landmarks may be independent features from car accidents. However, it is possible that a car accident relates to the facial landmarks showing that the driver is sleepy. Thus, the independent features of the facial landmark and the car accident may be correlated for analyzing car accidents. The deep pose analysis may be conducted to develop the correlation for unrelated events.

Figure 18:
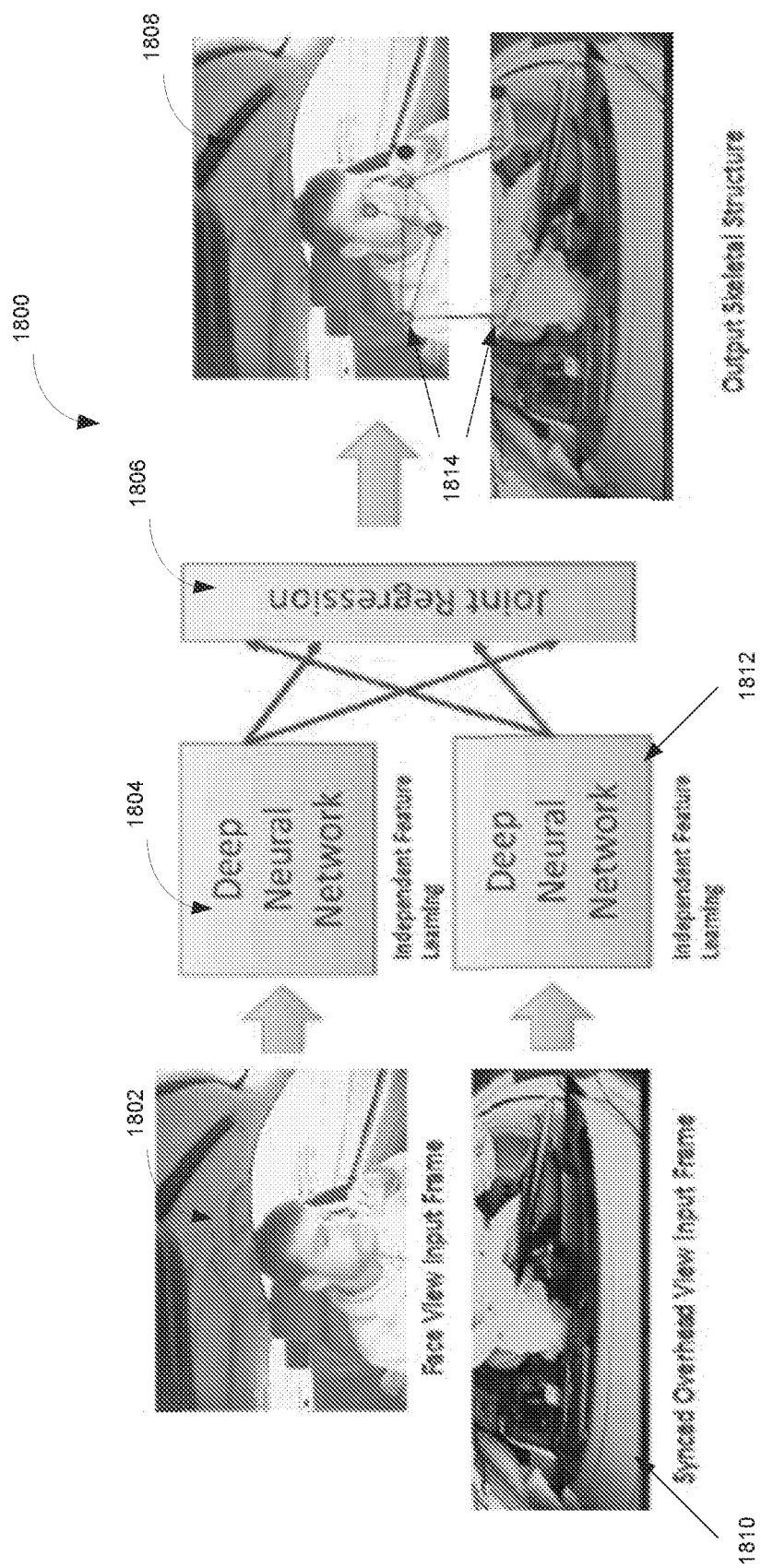
FIG. 18 illustrates an example of deep pose analysis.

FIG. 18 illustrates an example of deep pose analysis 1800. In FIG. 18, a machine learning method called deep neural network (DNN) is used. DNN is an artificial neural network with multiple hidden layers of units between the input and output layers. DNNs may be used to model complex non-linear relationships. In FIG. 18, the video frame with a face view 1802 is analyzed by using DNN. The DNN analysis is the independent learning that is conducted for input features extracted from the video frame. Similarly, the video frame with the car accident 1810 is also independently analyzed using DNN 1812 where the independent learning is conducted on extracted features. As shown in FIG. 18, a joint regression 1806 is performed on results of DNNs 1804, 1812 for both the face view and the car accident. In the result view 1808, the features 1814 extracted from the face view frame 1802 and the features extracted from car accident 1810 video are correlated. As illustrated in FIG. 18, by utilizing DNNs and the joint regression, the deep pose analysis can correlate two or more independent features to develop correlations for individual events. In this manner, the inherent correlation or relationship among independent features extracted from video frames may be discovered.

Driver's gesture and actions during driving may be tracked and extracted. For example, driver's gesture and actions may be categorized into multiple classes such as "driving," "adjust mirror," and "touch face," and the recorded video may be tracked and extracted according to the categorized classes. Table 4 shows an example result of this driver gesture/actions recognition. As shown in Table 4, the overall accuracy rate for recognizing driver gesture/actions is 79.83%. The recognized driver gesture/actions may be divided into multiple classes. As shown in Table 4, looking back/backing up and touching face are two classes of driver gesture/actions. The class of looking back/backing up has the highest recognition rate with a 87.80% overall recognition rate while the class of touching face has a lowest recognition rate with a 60% overall recognition rate.

As described above, the generalization of a driver's identity may be accomplished by replacing a driver's head with an avatar. However, the driver's identity may be generalized by showing a visualization representation of the driver in the video. For example, the driver in the car may be detected in a video, and the driver's facial tracking landmarks, head pose, and upper body pose skeleton may be identified afterwards. Thus, a visualization representation of the driver may be constructed by using the driver's facial tracking landmarks, head pose, and upper body pose skeleton. The visualization representation of the driver may be used to represent the driver and the driver's identity may thus be hidden.

Sometimes, passenger detection may be included in tracking driving behaviors. For example, a camera may capture a wide angle view inside a car, such that the passenger inside the car is captured. The tracking and extracting methods applied to the driver may also be applied to track and extract the passenger. For example, face detection, facial landmarks, and head pose of the passenger may be tracked and extracted. For the same reasons as generalizing the identity of the driver, the passenger's identity may be generalized. In order to replace a passenger's head with an avatar and generate a visualization representation for the passenger, the identity of driver and passenger may be generalized by blurring their images in the video. For example, the captured image may be processed to make it blur enough to make persons in the vehicle unidentifiable. Thus, the identity of both the driver and the passenger may be generalized, as will be discussed in greater detail below. Sometimes, other features inside the car may be extracted and tracked. For example, steering wheel detection, safety belt detection, and/or atmospheric classification may be performed.

TABLE 4

Driver gesture/action recognition
(Overall accuracy: 79.83%)

| Class | True Positive | True Positive + False Positive | True Positive + miss detection | Recall | Precision |
|---|---|---|---|---|---|
| Make phone call | 35 | 56 | 42 | (83.33%) | (62.5%) |
| Put on glasses | 25 | 28 | 29 | (86.21%) | (89.29%) |
| Driving (default) | 24 | (35 | 29 | (82.76%) | (68.57%) |
| Adjust mirror | 10 | 12 | 14 | (71.43%) | (83.33%) |
| Talk to passenger | 37 | 44 | 44 | (84.09%) | (84.09%) |
| Drink from a cup | 24 | 26 | 33 | (72.73%) | (92.31%) |
| Rest arm on window | 18 | 20 | 23 | (78.26%) | (90%) |
| Put on safety belt | 25 | 27 | 29 | (86.21%) | (92.59%) |
| Take off safety belt | 23 | 32 | 28 | (82.14%) | (71.88%) |
| Look back-backing up | 36 | 38 | 41 | (87.80%) | (94.74%) |
| Touch face | 24 | 34 | 40 | (60%) | (70.59%) |

Figure 19:
FIG. 19 shows an example of exterior vehicle detection.

The detection and tracking for other vehicles may be included in analyzing driving behaviors. The driving behavior for one vehicle may be affected by activities of another vehicle on the road. Thus, the exterior video frames captured for detecting and identifying other vehicles in addition to the vehicle studied. FIG. 19 shows an example of exterior vehicle detection 1900. As shown in FIG. 19, three outside vehicles 1902 are detected.

Sometimes, external features may affect the driving behaviors. For example, in addition to other vehicles, the brake lights and turn signal of the outside vehicles may affect the driving behaviors of the vehicle studied. As such, the brake lights and turn signal of the outside vehicles may also be captured and detected.

Figure 20:
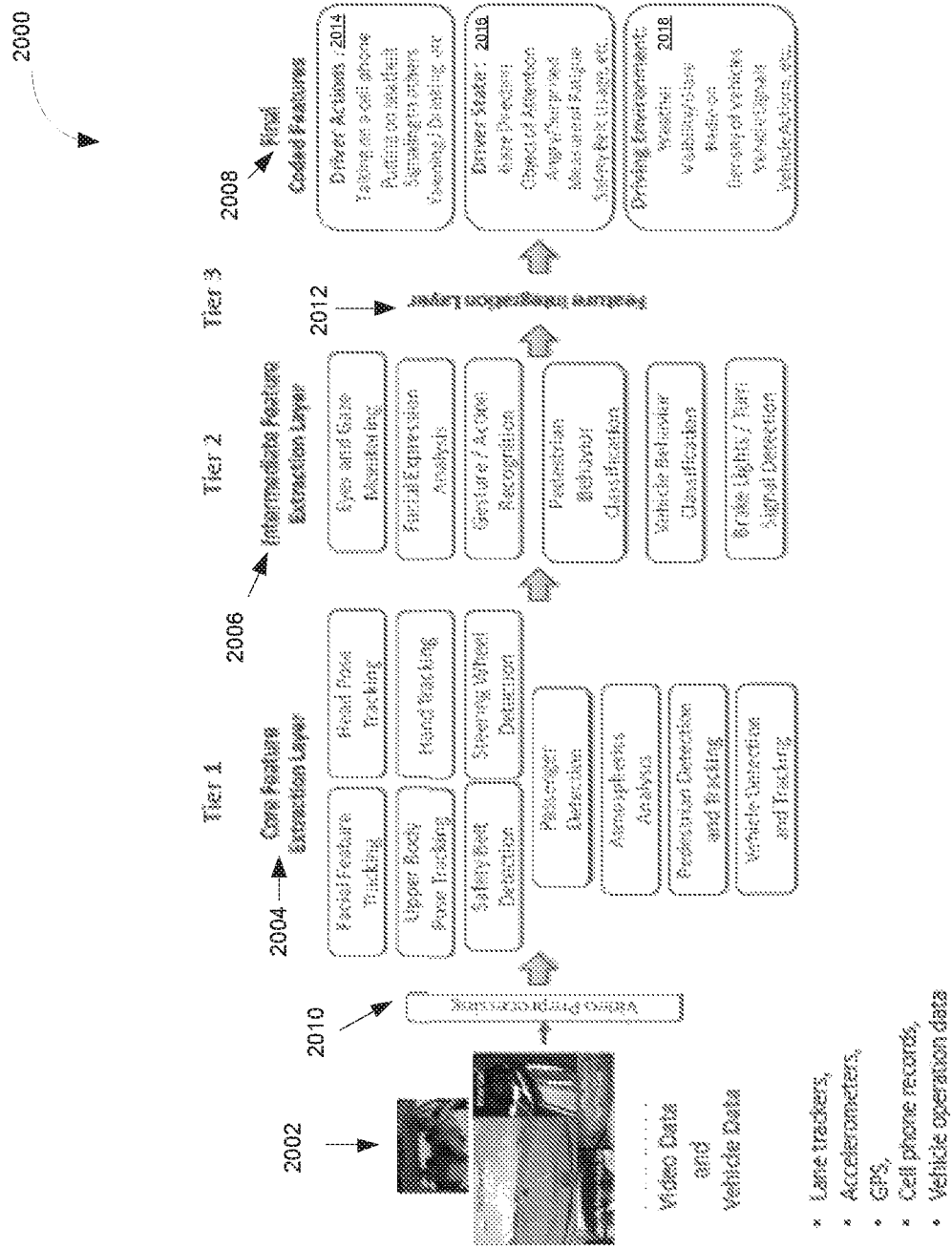
FIG. 20 illustrates a high level framework for monitoring driving conditions.

FIG. 20 illustrates a high level framework for monitoring driving conditions 2000. As shown in FIG. 20, the video data and vehicle data 2002 are provided. The video data and vehicle data 2002 may be obtained via various resources such as lane trackers, accelerometers, global positioning system (GPS), cell phone records, vehicle operation data and companion roadway information data. In FIG. 20, the video data and vehicle data are preprocessed 2010, for example, preprocessing the video data and vehicle data 2002 to enhance the contrast and/or remove unneeded pixels. The core features are extracted from the preprocessed video at core feature extraction layer 2004. The core features may include, but are not limited to, facial feature tracking, head post tracking, upper body pose tracking, hand tracking, safety belt detection, steering wheel detection, passenger detection, atmospherics analysis, pedestrian detection and tracking, and vehicle detection and tracking. The intermediate features may be developed by using or aggregating coded features at intermediate feature extraction layer 2006. The intermediate features may include, but are not limited to, eyes and gaze monitoring, facial expression analysis, gesture/action recognition, pedestrian behavior classification, vehicle behavior classification, and brake lights/turn signal detection. The intermediate features may be integrated and aggregated at feature integration layer 2012 to develop final coded features 2008. The final code features 2008 may include, but are not limited to, driver actions 2014, driver state 2016, and driving environment 2018. The driver actions 2014 may include, but are not limited to, talking on a cell phone, putting on a seatbelt, signaling to others, yawning, and drinking. The driver states 2016 may include, but are not limited to, gaze direction, objection of attention, angry and surprised, measure of fatigue, safety belt usage. The driving environments 2018 may include, but are not limited to, weather, visibility and glare, radio on, density of vehicles, vehicle signals, and vehicle actions.

FIG. 21 shows an example of user interface that displays a visualization representation of extracted video features from video 2100. As shown in FIG. 21, the video 2102 provided includes driver tracking video 2118 and vehicle tracking video 2116. The extracted video features may be visually represented by different curves or plots. In FIG. 21, curves or plots are displayed for the face tracking confidence 2104, head pose 2106, facial expression 2108, gaze target analysis 2110, blink tracking 2112, and mouth state 2114.

In FIG. 21, the mouth state curve 2114 is displayed. The mouth state tracking 2114 may not provide the content of talking as the audio data are too personal to be extracted. However, the mouth state 2114 can show whether the driver is talking or not while driving. The state of talking versus non-talking while driving may provide useful information for tracking driving behaviors.

Figure 22:
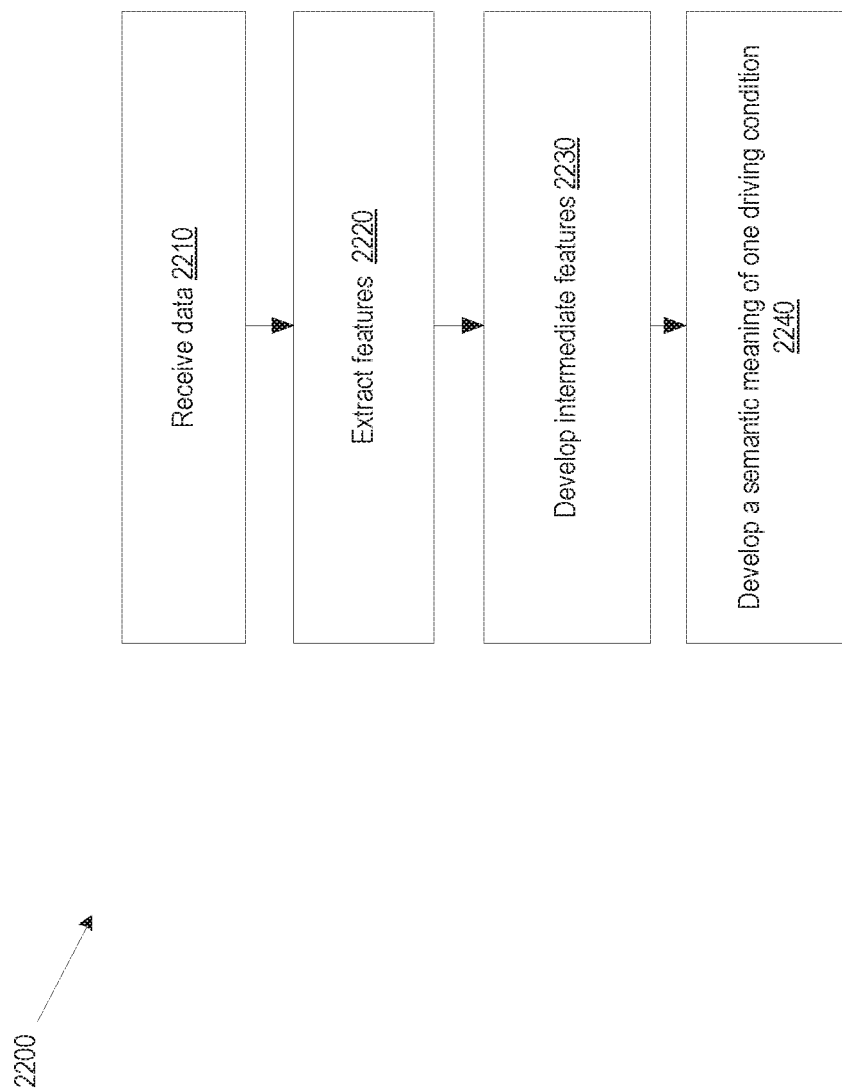
FIG. 22 is a flowchart that illustrates a method of tracking and extracting driving behaviors.

FIG. 22 is a flowchart that illustrates a method 2200 of tracking and extracting driving behaviors. As shown in FIG. 22, the method 2200 may include receiving video data 2210 where video frames are captured from one or more sensors, and the video frames represent an interior and/or exterior of a vehicle, extracting the one or more features from the video data 2220, where the extracting may include detecting and recognizing one or more features from the video data where each feature is associated with at least one driving condition, developing intermediate features 2230 by associating and aggregating the extracted features among the extracted features; and developing a semantic meaning 2240 for the at least one driving condition by utilizing the intermediate features and the one or more extracted features. FIG. 22 merely illustrates one example of a method that can be used to track and extract driving behaviors. Other methods may also be developed in light of above disclosures.

Figure 23:
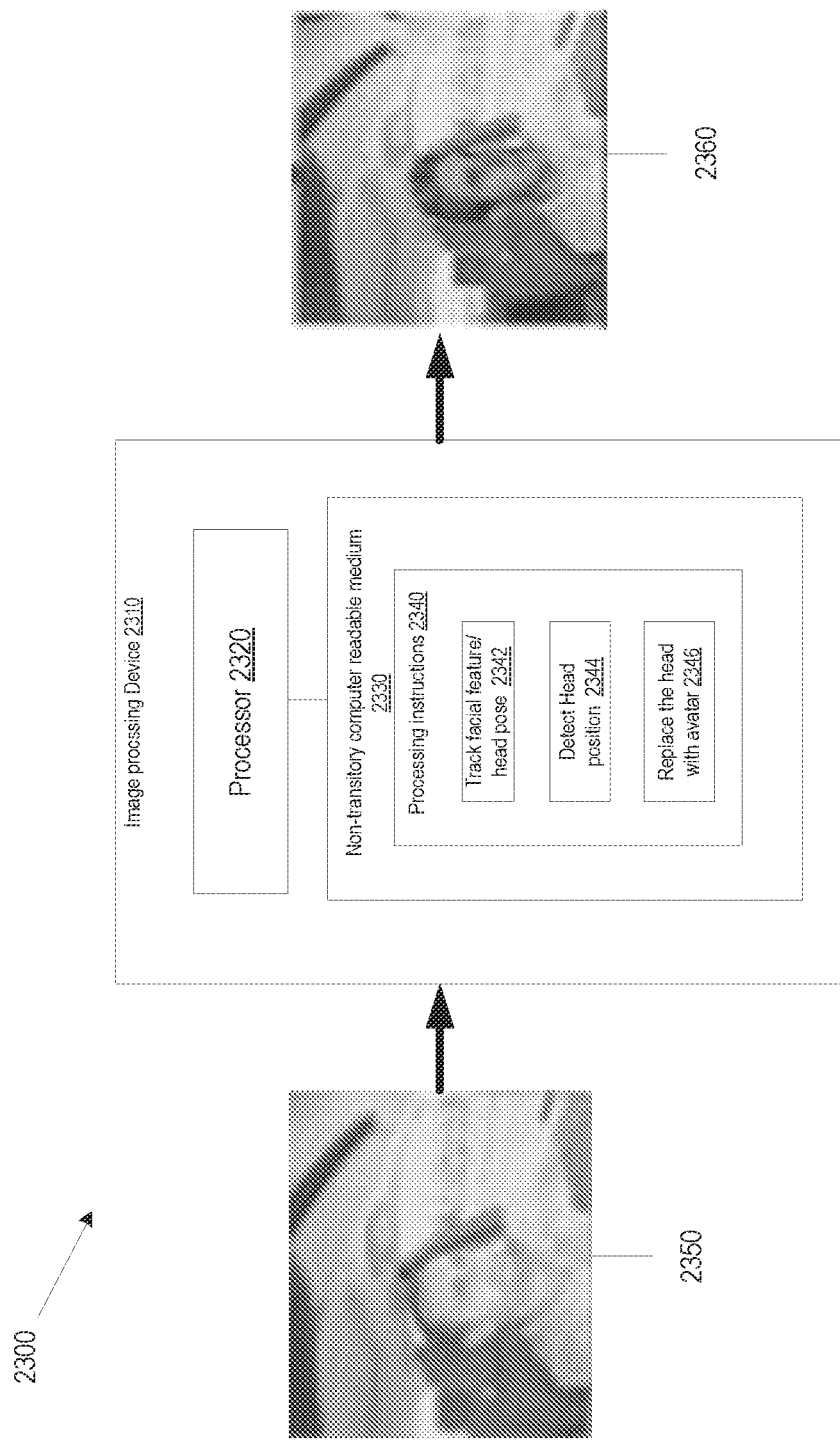
FIG. 23 depicts an example image processing device that can be used to replace a driver's head with an avatar.

As described above, it is important to protect the privacy of the driver (and/or passenger) for tracking driving behaviors. As such, generalization of driver's identity in the tracked video may be needed. One way to generalize the driver's identity is to utilize an image processing device to mask the identity of the driver and replace the driver's head with an avatar. FIG. 23 shows an example image processing device that can be used to replace the driver's head with an avatar.

In FIG. 23, an imaging processing device 2310 may include one or more processors 2320 and non-transitory computer readable medium 2330. The processing instructions 2340 may be stored in the non-transitory computer readable medium 2330. The processing instructions 2340 may be executed by the processor 2320 and cause the processor 2320 to track facial features and the head pose 2342 of a driver in the input image 2350, detect the head position 2344 and replace the driver's head with an avatar 2346 in the input image 2350 to output the processed image 2360. In the processed image 2360, the driver's head is replaced with the avatar and the driver's identity is thus generalized and protected. While the use of an avatar and masking the identity of a person is reference with respect to a driver, the same methods may be utilized to mask the identity of a passenger or may be used in other contexts beyond driving, for example, in a retail or other environment.

Figure 24:
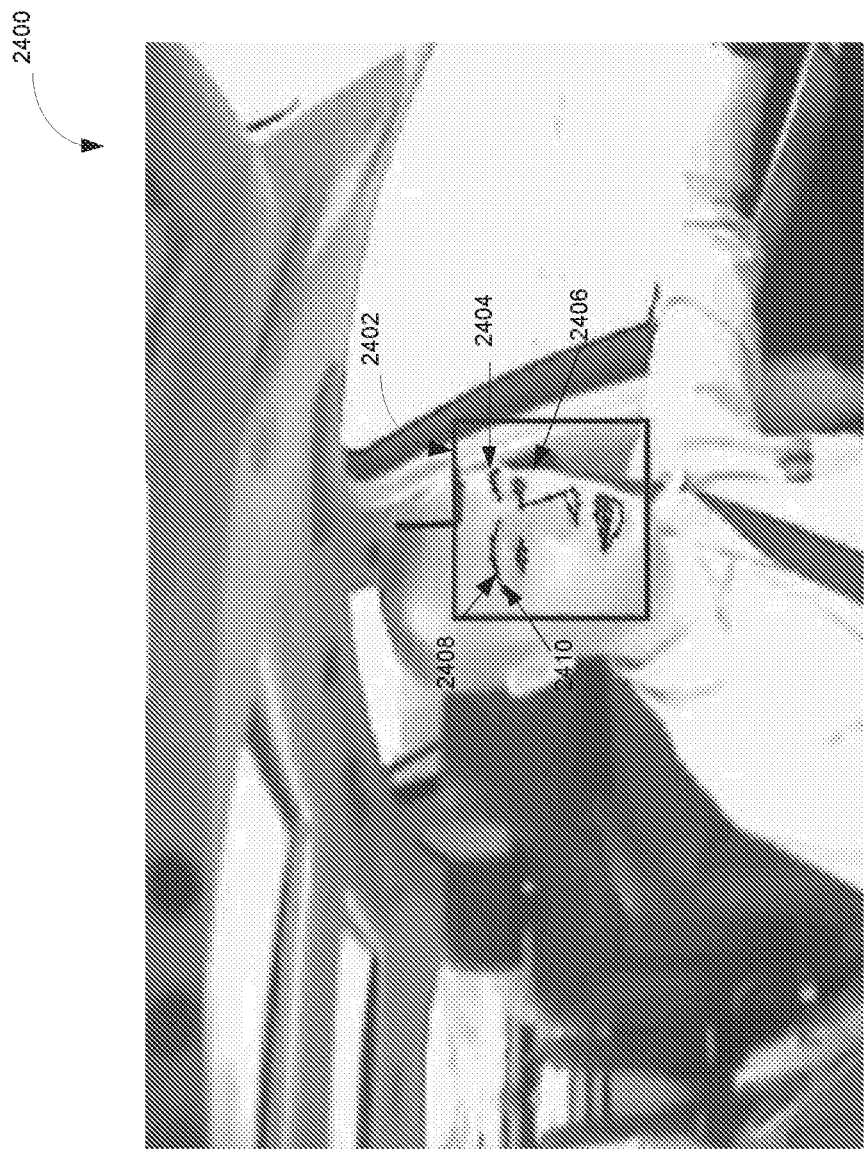
FIG. 24 illustrates a captured image that is used for tracking facial features and head pose.

The driver's facial features and head pose may be tracked. The image processing device 2310 may include a camera to capture the interior image of a driving car having a driver inside. The camera may be adjusted and oriented to track the front face of the driver. FIG. 24 illustrates a captured image 2400 that is used for tracking facial features and head pose. In FIG. 24, the head location includes the front face area 2402 that is identified in the captured image 2400. Inside the identified front face area 2402, the facial features and landmarks 2404, 2406 are also identified and tracked. The facial features and landmarks may include eyes, noses, and mouths on the face. As shown in FIG. 24, the features and landmarks may be identified and tracked by dots 2408 and lines 2410 connecting the dots 2408. The dots 2408 may be annotated by experts or may be identified by the image processing device 2310. The image processing device 2310 may identify features and landmarks with multiple dots 2408 by performing the image recognition process. The image recognition process may be trained by one or more machine learning methods such as CNN. The previously captured images may be used to train the image recognition process. The image processing device 2310 may add lines 2410 to connect dots 2408 that identify features and landmarks on the face.

Figure 25:
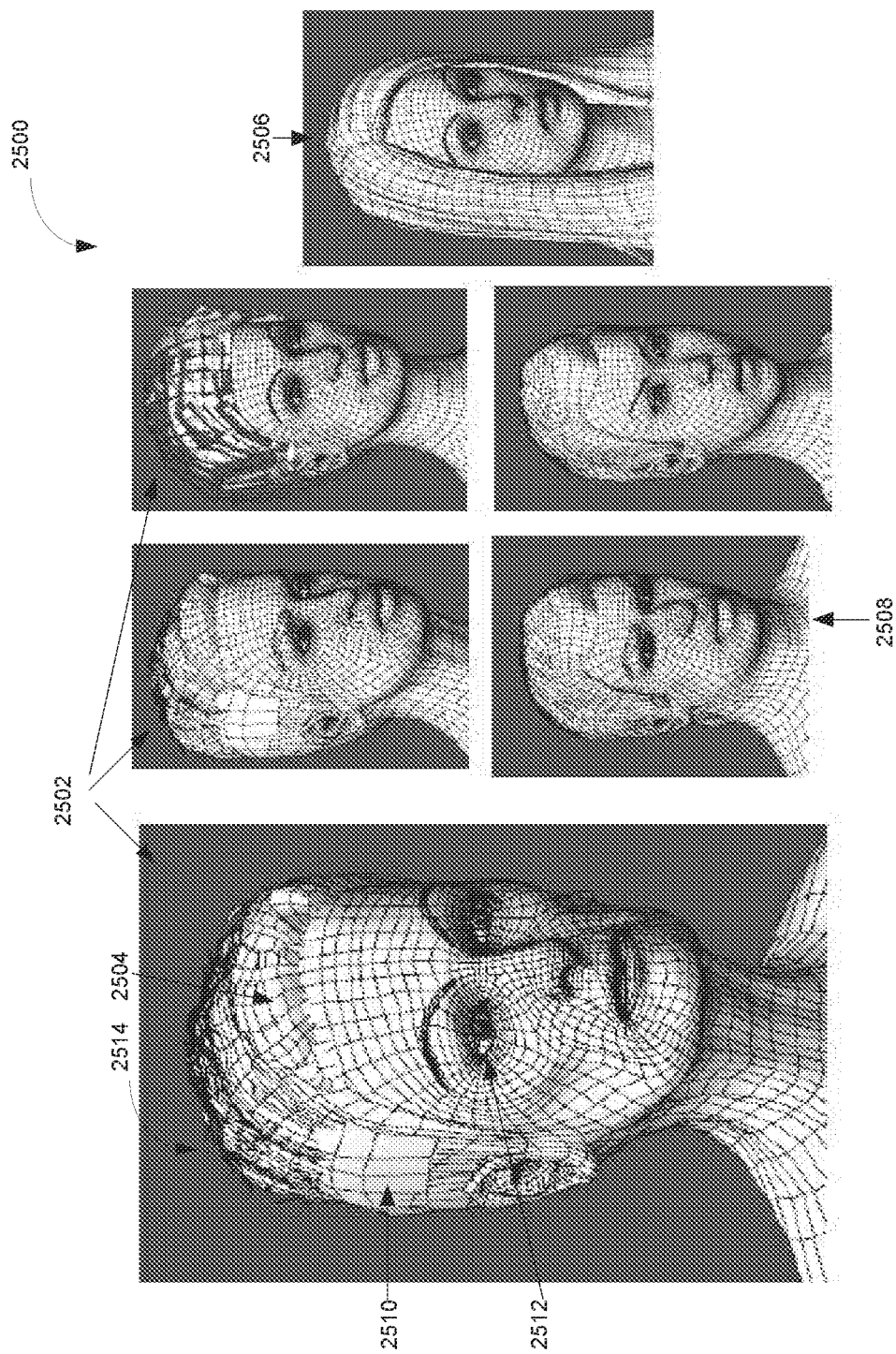
FIG. 25 depicts a number of generated example avatars.

One or more avatars may be created for replacing the driver's face. FIG. 25 shows a number of generated example avatars 2500. The generated avatars in FIG. 25 may be either two-dimensional or three-dimensional. As shown in FIG. 25, the generated avatars 2502 may have a front face and the gender of the avatars may or may not be recognizable. When the gender of the avatar is recognizable, for example, a female avatar 2506 may have long hair and the male avatar 2508 may have short hair. As shown in FIG. 25, a mesh 2504 may be applied to the generated avatars 2502. The applied mesh 2504 may cover all areas of the generated avatars 2504. The mesh density may not be equally distributed, for example, the mesh for some areas of the generated avatars may be denser than the mesh for other areas. In FIG. 25, for the generated avatar on the left 2514, the mesh for the eye area 2512 is denser than the mesh for the hair area 2510. Even though different generated avatars may have different head shapes and facial features and landmarks, the mesh applied to the different avatars may have the same set of mesh vertices and similar mesh density.

Figure 26:
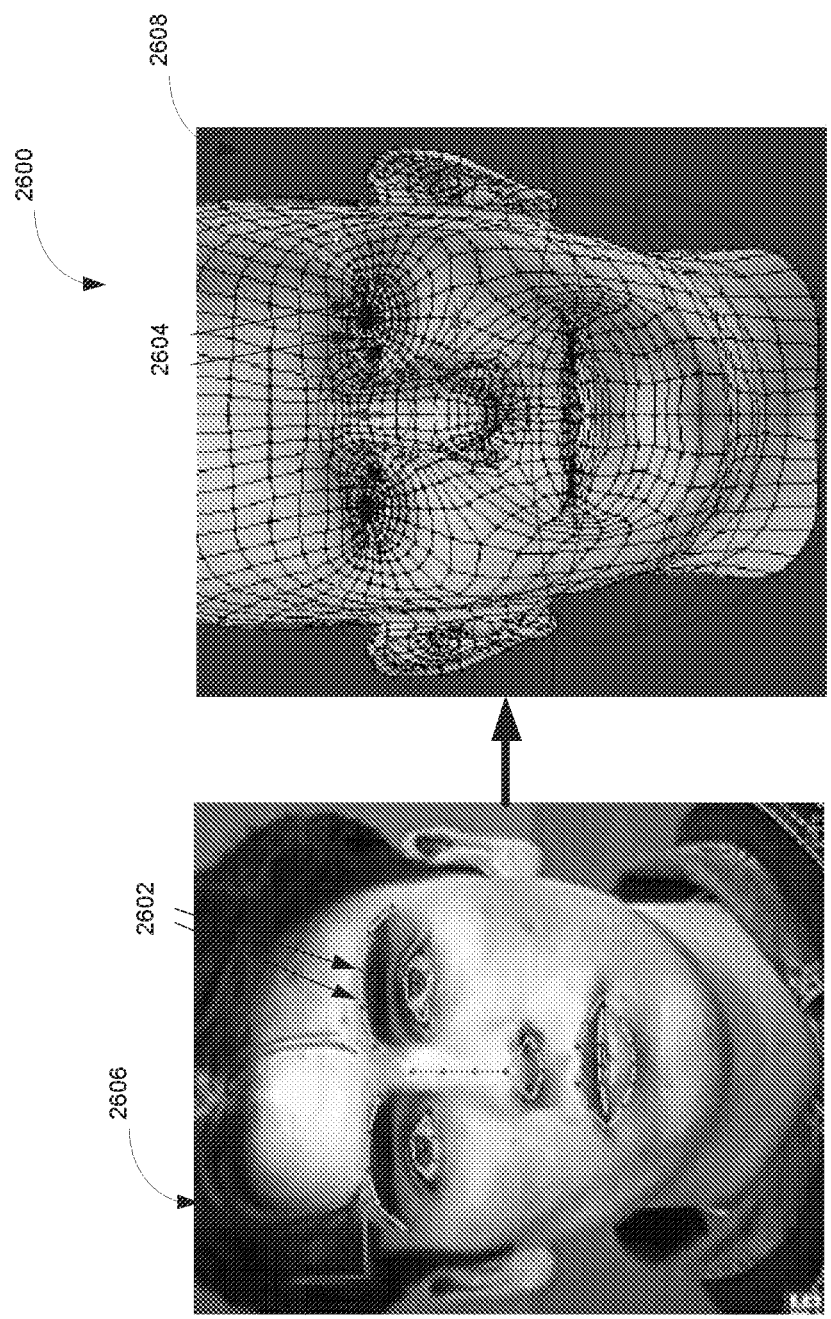
FIG. 26 illustrates mapping of facial landmarks between a tracked image and a generated avatar.

The mesh may be used for transferring motions from the driver's face to the avatar. The tracked landmark points may be mapped to mesh vertices on the generated avatar. FIG. 26 illustrates the mapping of facial landmarks between the tracked image and the generated avatar 2600. As shown in FIG. 26, for each tracked landmark point 2602 in the tracked image 2606, the closest mesh vertices 2604 in the generated avatar 2608 is found and mapped. This mapping process may be repeated until all tracked landmark points 2602 in the tracked image 2606 are mapped to the mesh vertices 2604 in the generated avatar 2608. As multiple avatars are generated, the landmark point mapping may be performed for each of generated avatars. However, because different avatars may have the same set of mesh vertices and the similar mesh density, the mappings for multiple avatars may be as simple as copying the map from one avatar to other generated avatars.

Figure 27:
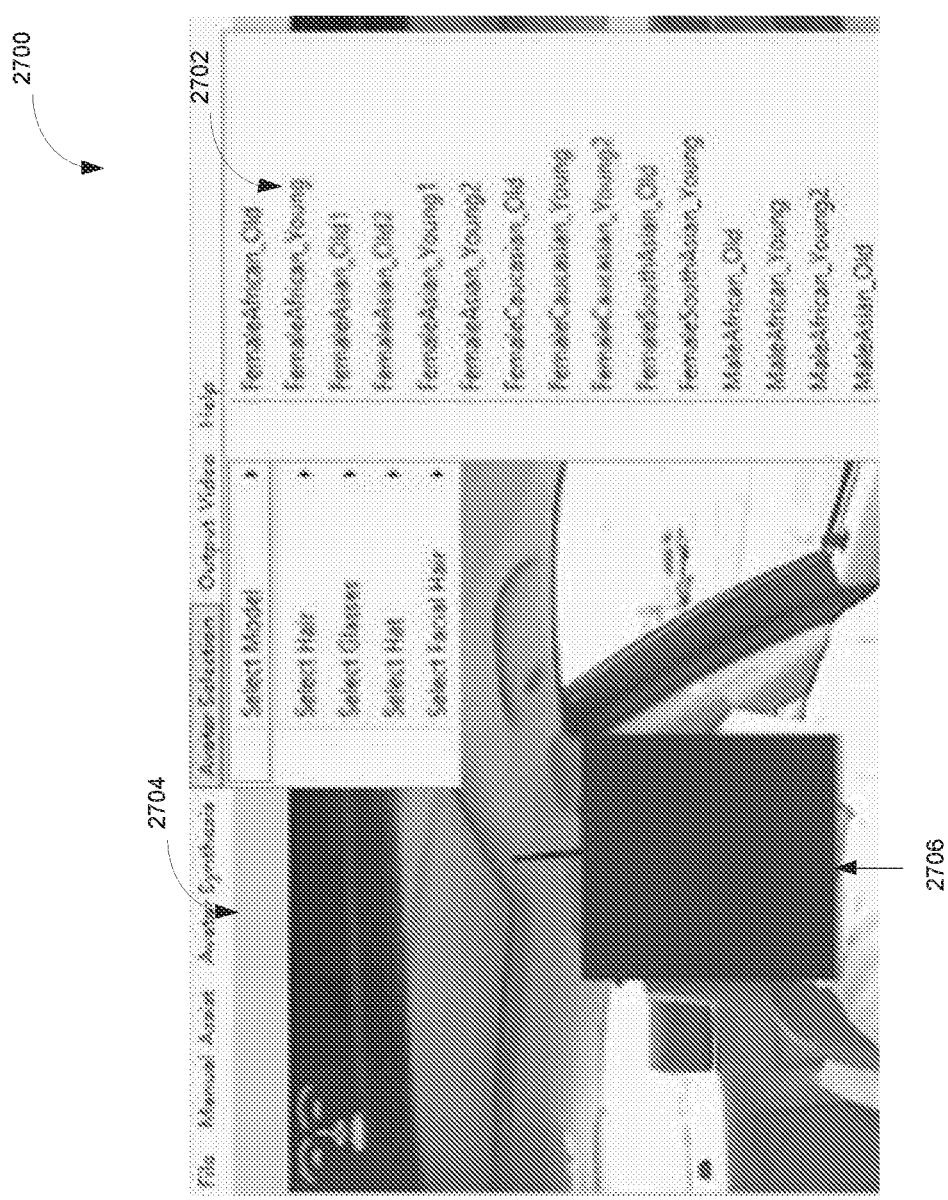
FIG. 27 shows a user interface for selecting the generated avatar for replacing the driver's head.

One of the generated avatars may be selected for head replacement by utilizing a user interface. FIG. 27 shows a user interface for selecting the generated avatar for replacing the driver's head 2700. As shown in FIG. 27, the driver's head location 2706 is identified and tracked in the tracked driving image 2704. A list of generated avatars 2702 is displayed in the user interface 2700 and a user may select one of the listed generated avatars 2702 to replace the detected and tracked driver's head in the identified head location 2706.

Figure 28:
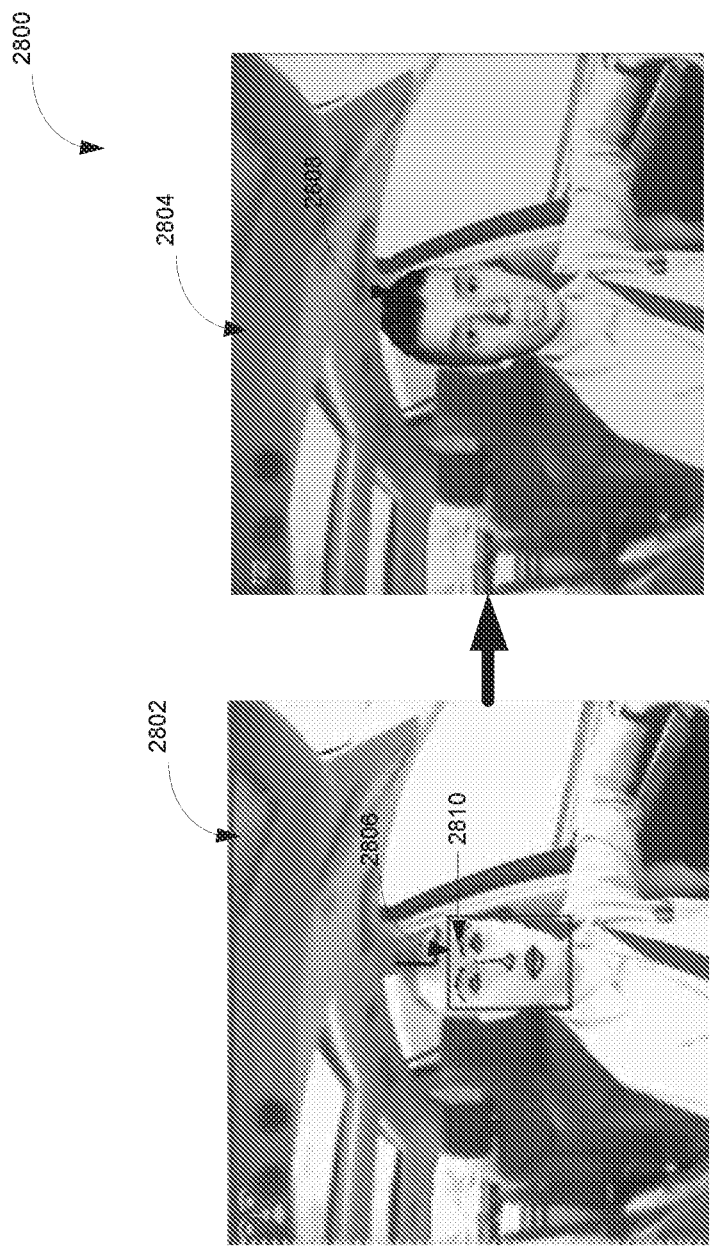
FIG. 28 illustrates motion transferred between a driver's head and a selected avatar.

The motion of the driver in the tracked video may be transferred to the selected avatar. FIG. 28 illustrates the motion transferred between the driver's head to the selected avatar 2800. In FIG. 28, the captured video 2802 for tracking driving activities is provided. In the captured video 2802, a head location/box area 2806 of the driver is detected. As illustrated in FIG. 28, a box area 2806 depicts the location of a driver's head. Even though the driver's head may not move too much while driving, the box area 2806 for the driver's head may not be still. Instead, the box area 2806 may move as the video progresses.

The moving box area 2806 may be replaced with a selected avatar. As shown in FIG. 28, a generated avatar 2808 is selected. The avatar selection may be made by using the user interface illustrated in FIG. 27. The detected driver's head in the box area 2806 is replaced by the selected avatar 2808 to achieve the replaced video 2804 as shown in FIG. 28. Because the box area may move as the video progresses, the replaced avatar 2808 will move accordingly in the replace video 2804.

The motion of the driver's head in the captured video 2802 may be transferred. As shown in FIG. 28, facial landmarks 2810 are identified and tracked in the captured video 2802. As the landmark points are mapped to mesh vertices on the avatar mesh as illustrated in FIG. 26, the movements of facial landmarks 2810 may also transferred to the selected avatar 2808. As such, the replaced avatar 2808 may not only move according to the movements of the box area 2806, the eyes, nose, mouth and facial expressions of the replaced avatar 2808 in the replace video 2804 may also move according to the movements of the facial landmarks in the captured video 2802. Thus, the motion of the driver's head 2806 is transferred to the selected avatar 2802. After replacing the driver's head with the generated avatar 2808, the driver's identity is generalized.

Figure 29:
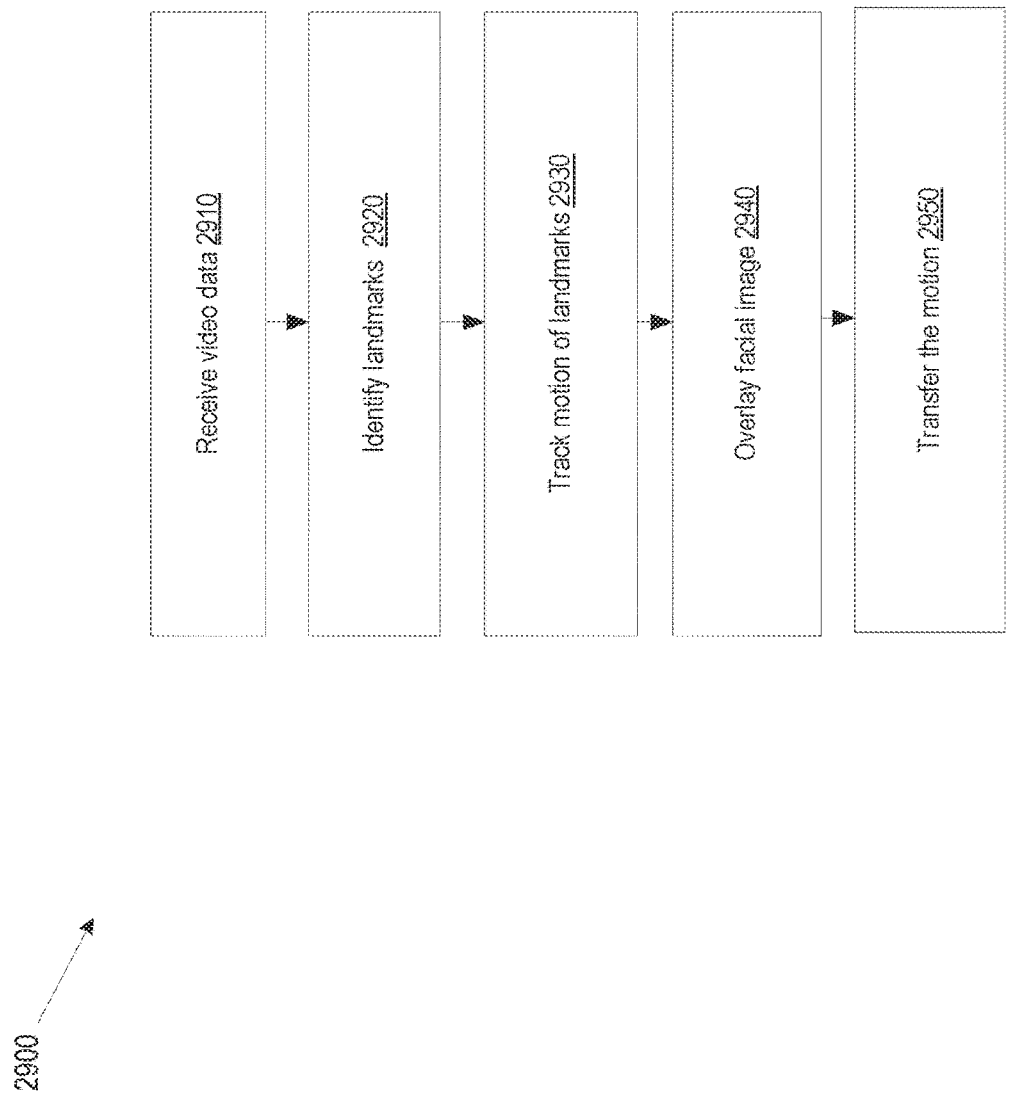
FIG. 29 shows logic for generalizing a driver's identity in recorded video.

FIG. 29 shows logic 2900 for generalizing a person's identity in recorded video. As shown in FIG. 29, the logic 2900 may include receiving video data comprising a set of video frames from one or more sensors 2910, identifying a plurality of landmarks on a face of a person within the set of video frames 2920, tracking motion of the landmarks and an orientation of the face of the person within the set of video frames 2930, overlaying a facial image over the face of the person in the video frames 2940 where the facial image may include a plurality of image landmarks positioned over the plurality of landmarks, and transferring the tracked motion of the landmarks and the orientation of the face of the person to the facial image overlaying the face of the person in the video frames 2950.

In the logic 2900 of FIG. 29, the overlaid facial image may be either a two-dimensional (2D) image or a three-dimensional (3D) image. The logic 2900 may further include analyzing tracked motion of landmarks and the orientation of the face to develop a motion state of the face, and preserving the motion state of the face after the face is overlaid by the facial image.

Figure 30:
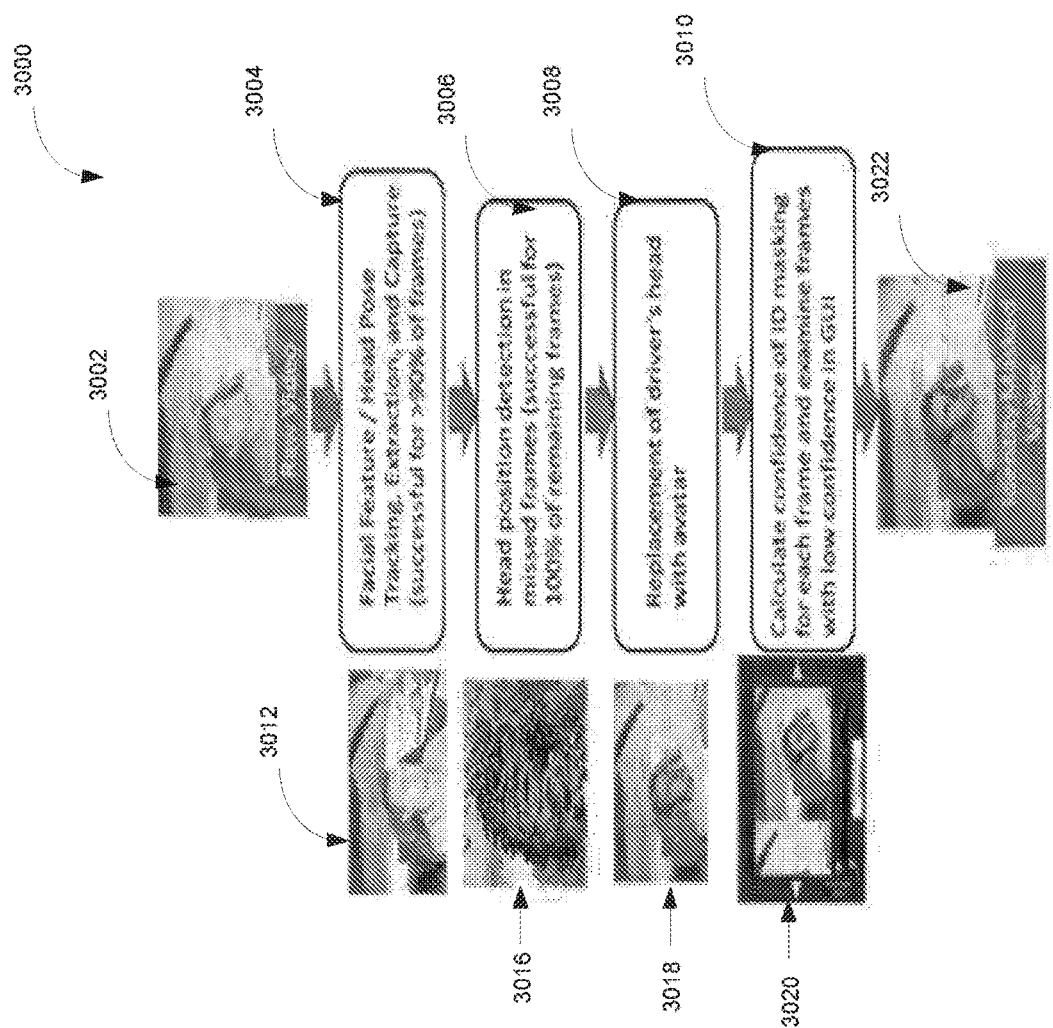
FIG. 30 shows one example implementation of logic as shown in FIG. 29.

The logic 2900 may be implemented in multiple ways. FIG. 30 shows one example implementation of logic 2900. As shown in FIG. 30, raw video 3002 may be captured and fed to a process that tracks, extracts, and captures facial features and head pose 3004. The tracked, extracted, and captured facial features are marked and annotated in the raw video 3002 to form the processed video 3012. As shown in FIG. 30, more than 90% of video frames can be successfully processed to track, extract, and capture the facial features and head pose. The tracked, extracted, and captured facial features and head pose may include, but are not limited to, eye state, facial expressions, lip moving, mouth opening, head pose and dynamics, and gaze directions.

Sometimes, the interpolations for head positions may be generated. For example, head positions may not be detected from some frames of the raw video 3002. Some video frames may be damaged 3016 and/or the driver's head may not be recognizable 3016. Thus, the interpolations for the driver's head may be generated 3006 for those video frames that the head positions can't be detected. The successfully detected head positions from other video frames that are close to the video frames without detected head positions may be used to generate interpolations.

The driver's head is replaced with an avatar 3008 after the head position, facial features, and head pose are detected, tracked, and extracted. The replacement of the driver's head with the avatar 3008 may include selecting an avatar, identifying the driver's head in the raw video 3002, replacing the driver's head with the selected avatar, and transferring the motion of the driver's head to the avatar.

Sometimes, corrections may be needed after the driver's head is replaced with the avatar. For example, as shown in FIG. 30, a confidence level for each frame with replaced avatar 3020 is calculated and, when the confidence level is low, a correction for the replaced avatar may be needed, and the correction may be made to the video frames. Even though the corrections may be made manually, it is possible to use the image processing device as shown in FIG. 23 to automatically correct errors within the video frames with a low confidence level. An identity masked video 3022 is developed after the corrections are made to correct for the low confidence level video frames.

Figure 31:
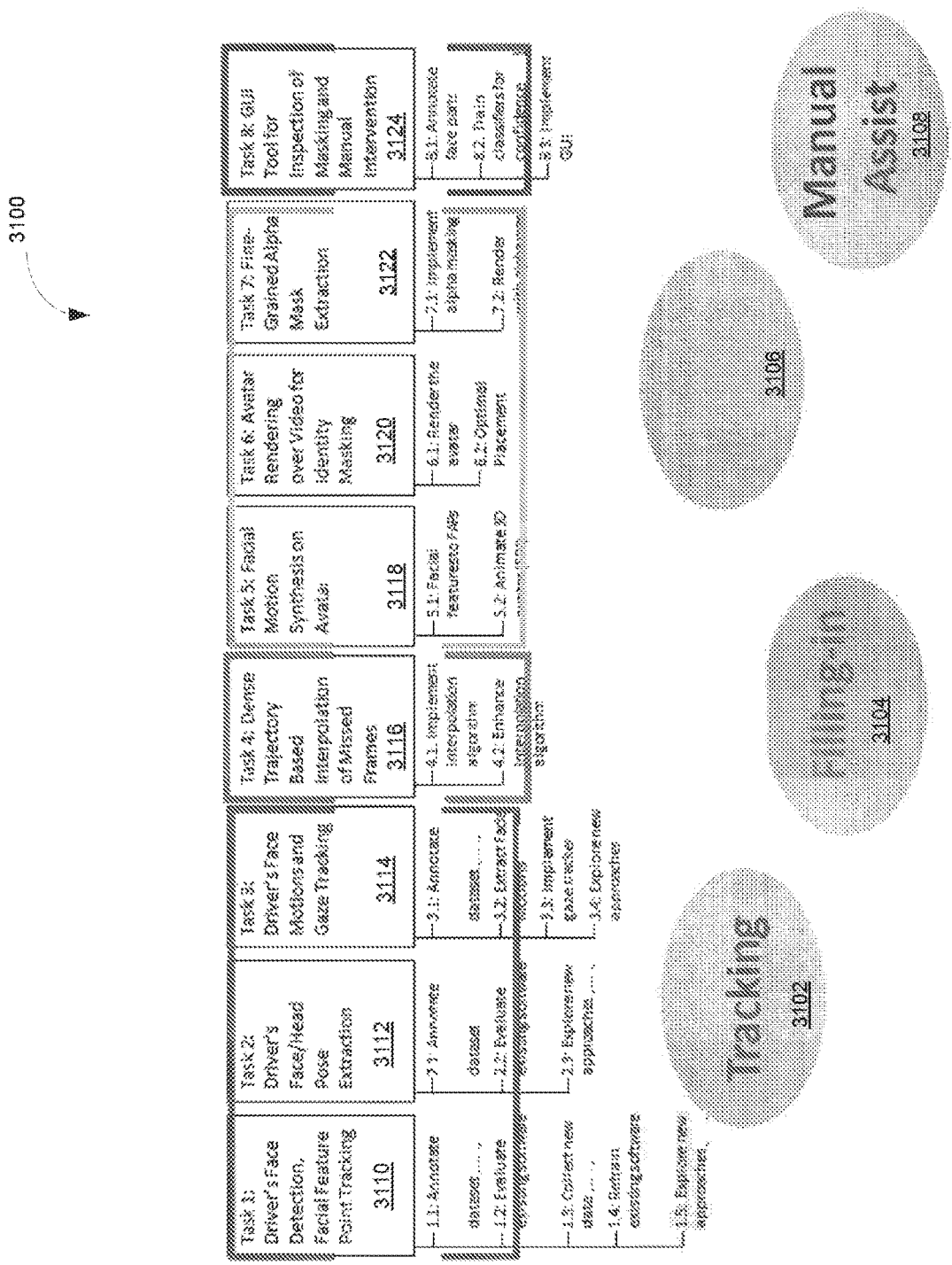
FIG. 31 depicts individual tasks of an identity masking implementation in FIG. 30.

FIG. 31 shows individual tasks for the identity masking implementation 3100 as illustrated in FIG. 30. As shown in FIG. 31, the identity masking implementation 3100 may include steps of tracking 3102, filling-in 3104, masking 3106, and manual assist 3108. The tracking step 3102 includes task 1, task 2 and task 3. Task 1 includes detecting the driver's face and tracking facial feature points 3110, task 2 include extracting the driver's face and head pose 3112, and task 3 include tracking the driver's face motions and gaze 3114. The filling-in step 3104 includes generating interpolations of missed frames according to the detectable video frames 3116. FIG. 31 shows three tasks (task 5, task 6, and task 7) for the masking step. Task 5 includes facial motion synthesis on the avatar 3118, task 6 includes rendering avatar over video for masking identity 3120, and task 7 includes fine-graining the mask 3112. In the manual assist step 3108, when video frames with the replaced avatar have low confidence level, the replaced avatar is manually corrected by utilizing a graphical user interface (GUI) tool 3124. The GUI tool can inspect and make the corrections to the video frames that have a low confidence level.

Figure 32:
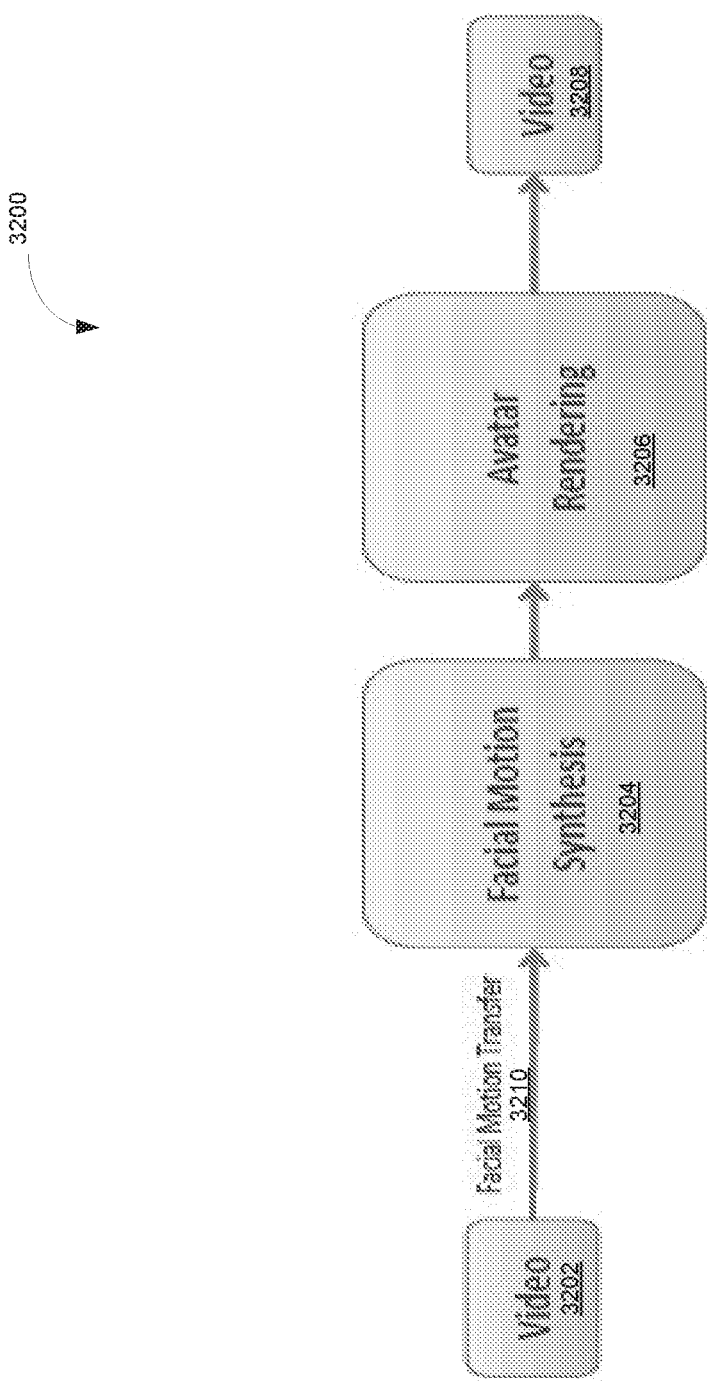
FIG. 32 illustrates a generalized implementation of avatar replacement for identity generalization.

FIG. 32 illustrates a generalized implementation of avatar replacement for identity generalization 3200. As shown in FIG. 32, from the input video 3202, the facial motions to be replaced are identified and transferred to an avatar 3210. The motions to be transferred may include eye state, facial expression, lip moving, mouth moving, head pose and dynamics, gaze direction, or any combination thereof. The transferred facial motions are synthesized within the avatar 3204.

The avatar is rendered 3206 for creating the output video 3208. Rendering is the process of generating an image. After the avatar is created and selected for the identity generalization in an input video and the facial motion of the original video is transferred to the generated avatar, the image of the avatar is rendered. The avatar is rendered according to the area to be replaced in the input video. The rendered avatar may include some or all of geometry, viewpoint, texture, lighting, and shading information from the input video. The rendered avatar is used to replace the identified area in the input video to create the output video 3208. After the replacement, the identity in the output video is generalized while the motion state and other facial information are preserved as much as possible The facial area of the input video may not be completely replaced with the avatar. Sometimes, 100% of the original facial area may be covered by the avatar. However, sometimes, it is possible to only cover a portion of the original face area by using the avatar to generalize the original face. For example, in some situations, the covering of the eye area may be good enough to generalize the identity of the input video. When only a part of the original facial area is replaced with an avatar, the motion for the replaced area in the input video 3202 is transferred to the avatar and the remaining unreplaced facial areas in the output video 3208 are the same as the area in the input video 3202. The identity for the person in the input video 3202 is thus generalized and the original motion state and facial features and landmarks are preserved as much as possible. Sometimes, when there are multiple identities in the input video to be replaced, the same process described above may also be used. The multiple identities may be generalized by using one or multiple avatars.

Figure 33:
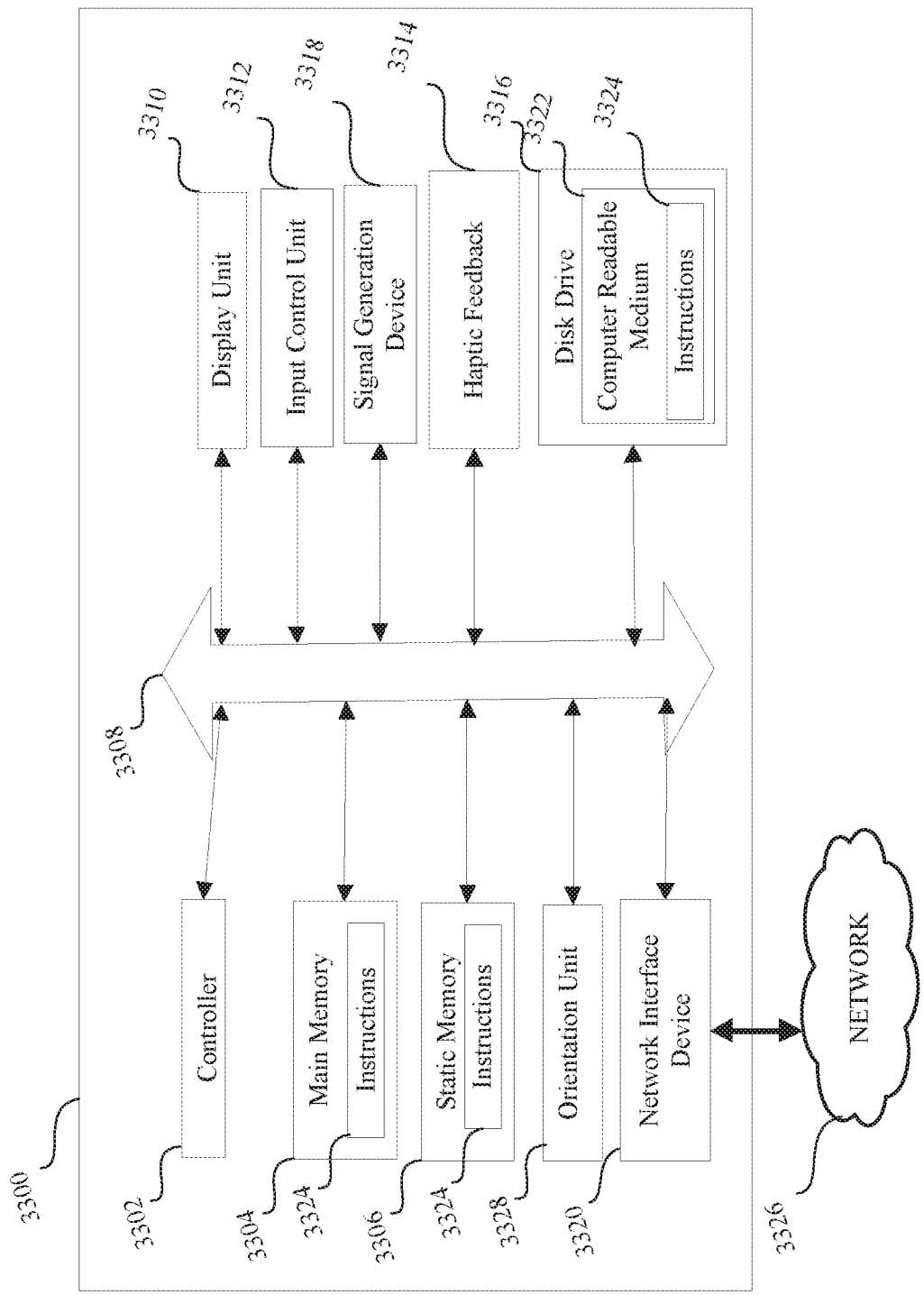
FIG. 33 illustrates an example of a computing system that may be used for monitoring driver behaviors.

FIG. 33 illustrates an example of a computing system that may be used for monitoring driver behaviors and/or generalizing a person's identity in a video. Referring to FIG. 33, an illustrative embodiment of a computing system 3300 may be used for one or more of the components illustrated by the method and system in FIGS. 1, 22, 23 and 29, or in any other system configured to carry out the methods discussed in this disclosure herein. Although the computing system 3300 is illustrated in FIG. 33 as including the illustrated components, it is within the scope of this innovation for the computing system to be comprised of fewer, or more, components than just illustrated in FIG. 33.

The computing system 3300 may include a set of instructions 3324 that can be executed to cause the computing system 3300 to perform any one or more of the methods, processes, or computer-based functions disclosed herein. For example, a device or a system that monitors driving behaviors or generalizes a person's identity in video as described herein may be a program comprised of a set of instructions 3324 that are executed by the controller 3302 to perform any one or more of the methods, processes, or computer-based functions described herein. Such a program may be stored in whole, or in any combination of parts, on one or more of the exemplary memory components illustrated in FIG. 33, such as the main memory 3304, static memory 3306, or hard drive 3316.

As described, the computing system 3300 may be mobile device. The computing system 3300 may also be connected using a network 3326 to other computing systems or peripheral devices. In a networked deployment, the computing system 3300 may operate in the capacity of a server or as a client user computer in a server-client user network environment, or as a peer computing system in a peer-to-peer (or distributed) network environment.

In addition to embodiments in which the computing system 3300 is implemented, the computing system 3300 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, a switch, a bridge, or any other machine capable of executing a set of instructions (sequential or otherwise) that specify actions to be taken by that machine. In a particular embodiment, the computing system 3300 can be implemented using electronic devices that provide voice, video or data communication. Further, while a single computing system 3300 is illustrated, the term "system" shall also be taken to include any collection of systems or sub-systems that individually or jointly execute a set, or multiple sets, of instructions to perform one or more computer functions.

As illustrated in FIG. 33, the computing system 3300 may include a controller 3302, such as a central processing unit ("CPU"), a graphics processing unit ("GPU"), or both. Moreover, the computing system 3300 can include a main memory 3304, and additionally may include a static memory 3306. In embodiments where more than one memory component is included in the computing system 3300, the memory components can communicate with each other via a bus 3308. As shown, the computing system 3300 may further include a display unit 3310, such as a liquid crystal display ("LCD"), an organic light emitting diode ("OLED"), a flat panel display, a solid state display, or a cathode ray tube ("CRT"). Additionally, the computing system 3300 may include one or more input devices 3312, such as a keyboard, push button(s), scroll wheel, digital camera for image capture and/or visual command recognition, touch screen, touchpad or audio input device (e.g., microphone). The computing system 3300 can also include signal outputting components such as a haptic feedback component 3314 and a signal generation device 3318 that may include a speaker or remote control as non-limiting examples.

Although not specifically illustrated, the computing system 3300 may additionally include a GPS (Global Positioning System) component for identifying a location of the computing system 3300.

The computing system 3300 may also include a network interface device 3320 to allow the computing system 3300 to communicate via wireless or wired communication channels with other devices. The network interface device 3320 may be an interface for communicating with another computing system via a Wi-Fi connection, Bluetooth connection, Near Frequency Communication connection, telecommunications connection, internet connection, wired Ethernet connection, or the like. The computing system 3300 may also optionally include a disk drive unit 3316 for accepting a computer readable medium 3322. The computer readable medium 3322 may include a set of instructions that are executable by the controller 3302, and/or the computer readable medium 3322 may be utilized by the computing system 3300 as additional memory storage.

In some embodiments, as depicted in FIG. 33, the hard drive unit 3316 may include a computer-readable medium 3322 in which one or more sets of instructions 3324, such as software, may be embedded. Further, the instructions 3324 may embody one or more of the methods, processes, or logic as described herein. In some embodiments, the instructions 3324 may reside completely, or at least partially, within the main memory 3304, the static memory 3306, and/or within the controller 3302 during execution by the computing system 3300. The main memory 3304 and the controller 3302 may also include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computing systems. One or more embodiments described herein may implement functions using two or more specific interconnected hardware modules or devices with related control and data signals that can be communicated between and through the modules, or as portions of an application-specific integrated circuit. Accordingly, the present computing system 3300 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computing system. Further, in an exemplary, non-limited embodiment, implementations can include distributed processing, component/object distributed processing, and parallel processing.

The present disclosure contemplates a computer-readable medium 3322 that includes instructions 3324 or receives and executes instructions 3324 responsive to a propagated signal so that a device connected to a network 3326 can communicate voice, video, or data over the network 3326. Further, the instructions 3324 may be transmitted or received over the network 3326 via the network interface device 3320.

While the computer-readable medium 3324 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computing system to perform any one or more of the methods or operations disclosed herein.

In a particular non-limiting, exemplary embodiment, the computer-readable medium 3322 can include a solid-state memory such as a memory card or other package that houses one or more non-volatile read-only memories, such as flash memory. Further, the computer-readable medium 3322 can be a random access memory or other volatile re-writable memory. Additionally, the computer-readable medium 3322 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 3322 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by network companies and broader resources and utilities institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Although the methods and systems disclosed herein may refer to tracking and/or monitoring behaviors interior or exterior to a car, it should be understood that the present disclosure is not limited to only cars. More particularly, any of the methods and/or systems herein may be applied to any vehicle, for example, trucks, buses, airplanes, motorcycles, or any other vehicles.

Still further, while the methods and systems disclosed herein may be discussed in relation to a driver of a vehicle, the methods and systems disclosed herein may be utilized in circumstances such as autonomous driving, partial driving by a person in a driver's seat, or may be utilized with respect to any passenger in the vehicle regardless of their location.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the invention. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the invention.

Although the above discussion discloses various exemplary embodiments of the invention, it should be apparent that those skilled in the art can make various modifications that will achieve some of the advantages of the invention without departing from the true scope of the invention.

ADDITIONAL EXAMPLES

Illustrative examples of the technologies disclosed herein are provided below. An embodiment of the technologies may include any one or more, and any combination of, the examples described below.

In an example 1, a method of monitoring driving conditions is provided and may include receiving video data comprising video frames from one or more sensors, identifying a face of a person within the video frames, identifying a plurality of landmarks on the face of the person and an orientation of the face, tracking motion of the landmarks and the orientation within the video frames, overlaying a facial image over the face of the person in the video frames, transferring the tracked motion of the landmarks and the orientation to the facial image overlaying the face of the person in the video frames, extracting one or more features from the video frames where each feature is associated with at least one driving condition, developing intermediate features by associating and aggregating the extracted features according among the extracted features, and developing a semantic meaning for the at least one driving condition by utilizing the extracted features and the intermediate features.

An example 2 includes the subject matter of example 1, wherein the facial image may include a set of image landmarks, and transferring the tracked motion may include transferring the tracked motion of the plurality of landmarks of the face of the person to motion of the set of image landmarks of the facial image.

An example 3 includes the subject matter of example 1 and/or 2, wherein the method may further include correlating at least two extracted features to develop the semantic meaning by running two independent regressions on the at least two extracted features and running a joint regression on results of the two independent regressions.

In an example 4, a method of masking an identity of a person in a set of video frames is provided. The method may include receiving video data comprising a set of video frames from one or more sensors, identifying a face of a person within the set of video frames, identifying a plurality of landmarks on the face of the person and an orientation of the face, tracking motion of the landmarks and the orientation within the set of video frames, overlaying a facial image over the face of the person in the video frames, and transferring the tracked motion of the landmarks and the orientation of the face of the person to the facial image overlaying the face of the person in the video frames.

An example 5 includes the subject matter of example 4, wherein overlaying the facial image may include selecting one facial image from multiple facial images, and the multiple facial images may include a single set of image landmarks.

An example 6 includes the subject matter of example 4 and/or 5, wherein transferring the tracked motion may include transferring the tracked motion of the plurality of landmarks of the face of the person to motion of the single set of image landmarks of the selected facial image.

An example 7 includes the subject matter of example 4, 5, and/or 6, wherein the method may further include generating an interpolation of the face of the person for a video frame by using the identified face when the face of the person is not identifiable in the video frame.

An example 8 includes the subject matter of example 4, 5, 6, and/or 7, wherein the method may further include developing a motion state of the face by using identified landmarks and the orientation, and preserving the motion state of the face after the face is overlaid by the facial image.

An example 9 includes the subject matter of example 4, 5, 6, 7, and/or 8, wherein the method may further include determining a confidence level for the overlaid facial image.

An example 10 includes the subject matter of example 4, 5, 6, 7, 8, and/or 9, wherein the overlaid facial image may be a three-dimensional (3D) image.

In an example 11, a method of monitoring driving conditions is provided. The method may include receiving video data comprising video frames from one or more sensors where the video frames represent an interior or exterior of a vehicle, detecting and recognizing one or more features from the video data where each feature is associated with at least one driving condition, extracting the one or more features from the video data, developing intermediate features by associating and aggregating the extracted features among the extracted features, and developing a semantic meaning for the at least one driving condition by utilizing the intermediate features and the extracted one or more features.

An example 12 includes the subject matter of example 11, wherein the method may further include receiving safety data, and integrating the intermediate features and the safety data to develop the semantic meaning for driving conditions.

An example 13 includes the subject matter of example 11 and/or 12, wherein detecting and recognizing the one or more features may include training a detector by utilizing historical video data, and using the trained detector for extracting the one or more features from the video data.

An example 14 includes the subject matter of examples 11, 12, and/or 13, wherein training the detector may include running a regression on the historical video data utilizing a machine learning methodology.

An example 15 includes the subject matter of example 11, 12, 13, and/or 14, wherein detecting and recognizing the one or more features may include training a customized detector by using the received video data to generalize an identity for a driver of the vehicle, and using the customized detector for extracting the one or more features from the video data.

An example 16 includes the subject matter of example 11, 12, 13, 14, and/or 15, wherein detecting and recognizing the one or more features may include developing a model by averaging distances between identifiable points for the one or more features in historical video data, and using the model for extracting the one or more features from the video data.

An example 17 includes the subject matter of examples 11, 12, 13, 14, 15, and/or 16, wherein the method may further include enhancing the model by utilizing the extracted one or more features from the received video data.

An example 18 includes the subject matter of example 11, 12, 13, 14, 15, 16, and/or 17, wherein the method may further include correlating at least two extracted features to develop the semantic meaning.

An example 19 includes the subject matter of examples 11, 12, 13, 14, 15, 16, 17, and/or 18, wherein correlating at least two extracted features may include running at least two independent regressions for at least two extracted features, and the semantic meaning may be developed by running a joint regression on results of the at least two independent regressions.

An example 20 includes the subject matter of example 11, 12, 13, 14, 15, 16, 17, 18, and/or 19, wherein the method may further include displaying the extracted one or more features in a user interface.

What is claimed is:

1. A method of monitoring driving conditions, comprising:
   receiving video data comprising video frames from one or more sensors;
   identifying a face of a person within the video frames;
   identifying a plurality of landmarks on the face of the person and an orientation of the face;
   tracking motion of the landmarks and the orientation of the face within the video frames;
   overlaying a facial image over the face of the person in the video frames;
   transferring the tracked motion of the landmarks and the orientation to the facial image overlaying the face of the person in the video frames;
   extracting one or more features from the video frames, wherein each feature is associated with at least one driving condition;
   developing intermediate features by associating and aggregating the extracted features; and
   developing a semantic meaning for the at least one driving condition by utilizing at least the intermediate features.

2. The method of claim 1, wherein the facial image comprises a set of image landmarks, and transferring the tracked motion comprises transferring the tracked motion of the plurality of landmarks of the face of the person to motion of the set of image landmarks of the facial image.

3. The method of claim 1, further comprising correlating at least two extracted features to develop the semantic meaning by running two independent regressions on the at least two extracted features and running a joint regression on results of the two independent regressions.

4. A method of monitoring driving conditions via a monitoring module comprising program instructions stored in memory and causing one or more processors to execute the steps of:
   receiving video data comprising video frames from one or more sensors, wherein the video frames represent an interior or exterior of a vehicle;
   detecting and recognizing one or more features from the video data, wherein each feature is associated with at least one driving condition;
   extracting the one or more features from the video data;
   developing intermediate features by running regressions on the one or more extracted features and correlating at least two of the extracted features; and
   developing a semantic meaning for the at least one driving condition by utilizing at least the intermediate features.

5. The method of claim 4, further comprising:
   receiving safety data; and
   integrating the intermediate features and the safety data to develop the semantic meaning for driving conditions.

6. The method of claim 4, wherein detecting and recognizing the one or more features comprises training a detector by utilizing historical video data, and using the trained detector for extracting the one or more features from the video data.

7. The method of claim 6, wherein training the detector comprises running a regression on the historical video data utilizing a machine learning methodology.

8. The method of claim 4, wherein detecting and recognizing the one or more features comprises training a customized detector by using the received video data to generalize an identity for a driver of the vehicle, and using the customized detector for extracting the one or more features from the video data.

9. The method of claim 4, wherein detecting and recognizing the one or more features comprises developing a model by averaging distances between identifiable points for the one or more features in historical video data, and using the model for extracting the one or more features from the video data.

10. The method of claim 9, further comprising enhancing the model by utilizing the extracted one or more features from the received video data.

11. The method of claim 4, further comprising correlating at least two extracted features to develop the semantic meaning.

12. The method of claim 4, wherein correlating at least two extracted features comprises running at least two independent regressions for the at least two extracted features, and the semantic meaning is developed by running a joint regression on results of the at least two independent regressions.

13. The method of claim 4, further comprising displaying the extracted one or more features in a user interface.

* * * * *